(12) United States Patent
O'Neill et al.

(10) Patent No.: US 9,349,104 B2
(45) Date of Patent: May 24, 2016

(54) LEARNING GEOFENCE MODELS DIRECTLY

(71) Applicant: Google Inc., Mountain View, CA (US)

(72) Inventors: Thomas Germano O'Neill, Mountain View, CA (US); Brian Patrick Williams, Mountain View, CA (US)

(73) Assignee: Google Inc., Mountain View, CA (US)

( * ) Notice: Subject to any disclaimer, the term of this patent is extended or adjusted under 35 U.S.C. 154(b) by 232 days.

(21) Appl. No.: 14/037,332

(22) Filed: Sep. 25, 2013

(65) Prior Publication Data

US 2015/0088792 A1    Mar. 26, 2015

(51) Int. Cl.

| | |
|---|---|
| *G06F 15/18* | (2006.01) |
| *G06N 99/00* | (2010.01) |
| *H04L 29/08* | (2006.01) |
| *G06N 5/02* | (2006.01) |
| *G06N 7/00* | (2006.01) |
| *G06K 9/62* | (2006.01) |

(52) U.S. Cl.
CPC .............. *G06N 99/005* (2013.01); *H04L 67/10* (2013.01); *G06K 9/6256* (2013.01); *G06N 5/025* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 5,005,143 A * | 4/1991 | Altschuler et al. ............ 702/181 |
| 7,962,152 B2 | 6/2011 | Buerger et al. | |
| 8,125,332 B2 | 2/2012 | Curran et al. | |
| 8,421,859 B2 | 4/2013 | Zhang et al. | |
| 2005/0159883 A1* | 7/2005 | Humphries et al. .......... 701/207 |

(Continued)

OTHER PUBLICATIONS

T. Mitchell, "Decision Tree Learning", Lecture Slides for Ch. 3 of textbook "Machine Learning", 1997.

(Continued)

*Primary Examiner* — Kakali Chaki
*Assistant Examiner* — Ababacar Seck
(74) *Attorney, Agent, or Firm* — McDonnell Boehnen Hulbert & Berghoff LLP

(57) ABSTRACT

Methods and apparatus are directed to geofencing applications that utilize machine learning. A computing device can receive a plurality of geofence-status indications, where a geofence-status indication includes training data associated with a geofence at a first location. The geofence is associated with a geographical area. The computing device trains a geofence-status classifier to determine a geofence status by providing the training data as input to the geofence-status classifier. The training data includes data for a plurality of training features. After the geofence-status classifier is trained, the computing device receives query data associated with a second location. The query data includes data for a plurality of query features. The query features include a query feature that corresponds to a training feature. The query data is input to the geofence-status classifier. After providing the query data, the trained geofence-status classifier indicates the geofence status.

20 Claims, 12 Drawing Sheets

(56) References Cited

U.S. PATENT DOCUMENTS

| | | | |
|---|---|---|---|
| 2006/0241859 A1* | 10/2006 | Kimchi et al. | 701/208 |
| 2007/0210936 A1 | 9/2007 | Nicholson | |
| 2009/0093958 A1 | 4/2009 | Wang et al. | |
| 2009/0286549 A1* | 11/2009 | Canon et al. | 455/456.1 |
| 2011/0063138 A1 | 3/2011 | Berkkobin et al. | |
| 2011/0133888 A1* | 6/2011 | Stevens et al. | 340/8.1 |
| 2011/0148626 A1* | 6/2011 | Acevedo | 340/539.13 |
| 2013/0045753 A1* | 2/2013 | Obermeyer et al. | 455/456.1 |
| 2013/0103307 A1* | 4/2013 | Sartipi et al. | 701/465 |
| 2013/0150086 A1* | 6/2013 | Caralis et al. | 455/456.3 |
| 2013/0170482 A1* | 7/2013 | Jung | 370/338 |

OTHER PUBLICATIONS

Wikimedia Foundation, Inc., "Geo-fence", May 21, 2013, available via the Internet at http://en.wikipedia.org/w/index.php?title=Geo-fence&oldid=556143923 (last visited Jan. 11, 2013).

* cited by examiner

Training Data 540: Time: 7:35 AM
Location: (lat(T2), long(T2))
Geofences: 0
Networks Available: WWAN and N10
WWAN: Sector 522, Power 50%
N10: Power 70%
Temperature = 45°
Sound Volume above Ambient = 0
Observed Landmarks? N
Observed Signage? N
...

Training Data 542: Time: 7:42 AM
Location: (lat(T5), long(T5))
Geofences: Geofence 526
Networks Available: 0
Temperature = 55°
Sound Volume above Ambient = 0
Observed Landmarks? N
Observed Signage? N
...

Training Data 544: Time: 7:51 AM
Location: (lat(T8), long(T8))
Geofences: 0
Networks Available: WWAN
WWAN: Sector 532, Power 90%
Temperature = 69°
Sound Volume above Ambient = 0
Observed Landmarks? N
Observed Signage? N
...

Training Data 546: Time: 7:55 AM
Location: (lat(T9), long(T9))
Geofences: Geofence 528
Networks Available: WWAN and N13
WWAN: Sector 532, Power 60%
N13: Power: 70%
Temperature = 72°
Sound Volume above Ambient = 0
Observed Landmarks? N
Observed Signage? N
...

FIG. 5B

Query Data 550 (from O1)
Time: 7:32 AM
Networks Available: WWAN and N10
WWAN: Sector 532, Power 20%
N10: Power 10%
Temperature = 42°
Sound Volume above Ambient = 0
Observed Landmarks? N
Observed Signage? N
...
Geofence Result 552
Not in Geofence. Weight = 0.95

Query Data 560 (from O4)
Time: 7:46 AM
Networks Available: WWAN and N12
WWAN: Sector 532, Power 40%
N12: Power 90%
Temperature = 61°
Sound Volume above Ambient = 0
Observed Landmarks? N
Observed Signage? N
...
Geofence Result 562
Remaining in Geofence 526. Weight = 0.9

Query Data 554 (from O2)
Time: 7:37 AM
Networks Available: WWAN and N11
WWAN: Sector 522, Power 80%
N11: Power 10%
Temperature = 48°
Sound Volume above Ambient = 0
Observed Landmarks? Tower 520 NNE
Observed Signage? N
...
Geofence Result 556
Remaining in Geofence 524. Weight = 0.6

Query Data 564 (from O5)
Time: 7:55 AM
Networks Available: WWAN
WWAN: Sector 532, Power 30%
Temperature = 70°
Sound Volume above Ambient = 0
Observed Landmarks? N
Observed Signage? N
...
Geofence Result 566
Out of Geofence 526. Weight = 0.52
Exit Message: n/a

FIG. 5C

LEARNING GEOFENCE MODELS DIRECTLY

BACKGROUND

Unless otherwise indicated herein, the materials described in this section are not prior art to the claims in this application and are not admitted to be prior art by inclusion in this section.

A geofence is a virtual region specified in relation to a corresponding geographical region. For example, a geofence that encircles at least part of a sports arena can be specified with a latitude and longitude pair of (lat, long) and a given radius; e.g., 100 meters. In other examples, polygons, such as triangles or rectangles, or other shapes can be used to specify a geofence.

A computing device, such as a mobile device, can authorize geofencing applications to monitor particular geofences. The example computing device can then receive message(s) when the device enters into an authorized geofence and/or exits the authorized geofence. Some geofences can include other geofences; e.g., the above-mentioned geofence for the sports arena can contain geofence(s) for points of interest, offices, facilities, and shops within the sports arena geofence, just as the physical sports arena can contain physical regions for the aforementioned points of interest, offices, facilities, and shops. Continuing this example, as the device moves into, around, and through the sports arena, the device can receive message(s) when entering the sports arena geofence, when subsequently entering into geofences within the sports arena geofence, and perhaps when leaving the sports arena geofence.

SUMMARY

In one aspect, a method is provided. A computing device receives a plurality of geofence-status indications. At least one geofence-status indication of the plurality of geofence-status locations includes training data associated with a geofence at a first location. The geofence is associated with a geographical area. A geofence-status classifier of the computing device is trained to determine a status of the geofence by providing the training data as input to the geofence-status classifier. The training data includes data for each of a plurality of training features. After the geofence-status classifier is trained, the computing device receives query data associated with a second location. The query data includes data for each of a plurality of query features, where the plurality of query features includes at least one query feature that corresponds to at least one training feature. The query data is provided as input to the trained geofence-status classifier. After providing the query data as input, the trained geofence-status classifier indicates the status of the geofence.

In another aspect, a computing device is provided. The computing device includes a plurality of sensors, a processor, and a computer-readable storage medium. The computer-readable storage medium has instructions stored thereon that, upon execution by the processor, cause the computing device to perform functions. The functions include: receiving a plurality of geofence-status indications, where at least one geofence-status indication of the plurality of geofence-status locations includes training data associated with a geofence at a first location, and where the geofence is associated with a geographical area; training a geofence-status classifier to determine a status of the geofence by providing the training data as input to the geofence-status classifier, where the training data includes data for each of a plurality of training features; after the geofence-status classifier is trained, receiving query data associated with a second location, where the query data includes data for each of a plurality of query features, and where the plurality of query features includes at least one query feature that corresponds to at least one training feature; providing the query data as input to the trained geofence-status classifier; and after providing the query data as input, indicating the status of the geofence using the trained geofence-status classifier.

In another aspect, an apparatus is provided. The apparatus includes a computer-readable storage medium having instructions stored thereon that, upon execution by a computing device, cause the apparatus to perform functions. The functions include: receiving a plurality of geofence-status indications, where at least one geofence-status indication of the plurality of geofence-status locations includes training data associated with a geofence at a first location, and where the geofence is associated with a geographical area; training a geofence-status classifier to determine a status of the geofence by providing the training data as input to the geofence-status classifier, where the training data includes data for each of a plurality of training features; after the geofence-status classifier is trained, receiving query data associated with a second location, where the query data includes data for each of a plurality of query features, and where the plurality of query features includes at least one query feature that corresponds to at least one training feature; providing the query data as input to the trained geofence-status classifier; and after providing the query data as input, indicating the status of the geofence using the trained geofence-status classifier.

In another aspect, a device is provided. The device includes: means for receiving a plurality of geofence-status indications, where at least one geofence-status indication of the plurality of geofence-status locations includes training data associated with a geofence at a first location, and where the geofence is associated with a geographical area; means for training a geofence-status classifier to determine a status of the geofence by providing the training data as input to the geofence-status classifier, where the training data includes data for each of a plurality of training features; means for, after the geofence-status classifier is trained, receiving query data associated with a second location, where the query data includes data for each of a plurality of query features, and where the plurality of query features includes at least one query feature that corresponds to at least one training feature; means for providing the query data as input to the trained geofence-status classifier; and means for, after providing the query data as input, indicating the status of the geofence using the trained geofence-status classifier.

BRIEF DESCRIPTION OF THE FIGURES

In the figures:

FIGS. 5A-5C depict a scenario for training and using machine-learning systems in geofencing related to a moving object, in accordance with an example embodiment.

DETAILED DESCRIPTION

Overview

Figure 1:
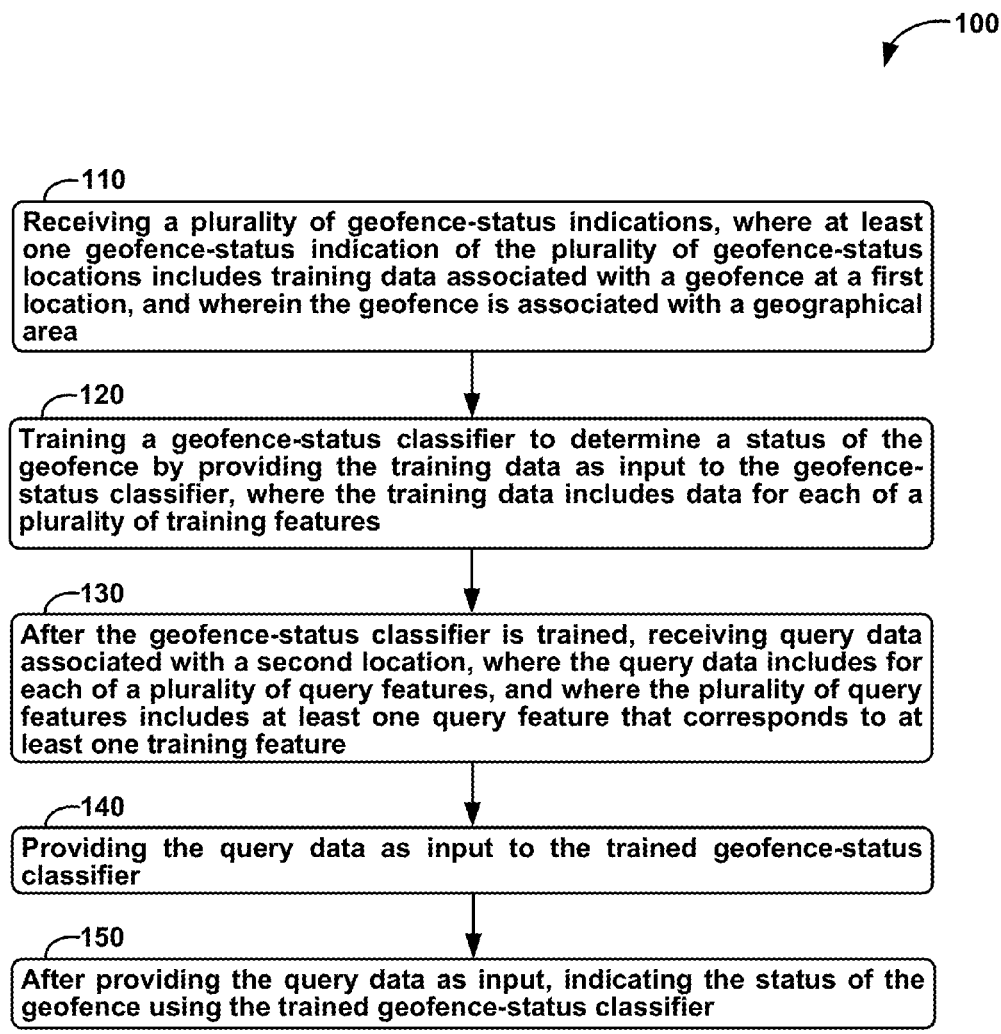
FIG. 1 is a flow chart of a method, in accordance with an example embodiment.

Disclosed herein are techniques for determining and applying machine-learning techniques by a machine-learning system for geofencing. A machine-learning system can adapt a computing device, such as a mobile device like a smartphone, tablet, head-mountable device (HMD), or wrist-mountable device, based on experience within an environment by operating upon data gathered and/or sensed from the environment. In the context of geofencing, the machine-learning system can determine whether or not the computing device has entered a geofence, exited a geofence, and/or is inside or outside a geofence.

Example machine-learning techniques include classifying, clustering, ranking, and predicting an output based on input data. The input data can include data about the environment, as well as other data (e.g., timing information, configuration data for the computing device, metadata about the input data and/or output). Classifying data can involve putting data with a number N of possible values into one of C1 pre-determined categories, where C1 is finite. For an example with C1=2, a mobile platform can be classified, for each value T of a set of times, into one of two categories: either "powered up" or "not powered up". Classification can be performed using one or more statistical classification techniques, such as, but not limited to, decision trees, linear classifiers, support vector machines, quadratic classifiers, kernel estimation, neural networks, Bayesian techniques and/or networks, hidden Markov models, binary classifiers, and/or multi-class classifiers.

Clustering data can involve putting data with a number N of possible values into one of C2 clusters, where C2 is finite, and where the clusters are not necessarily pre-determined. Generally, each data item in a given cluster is more similar to each other than to data item(s) in other cluster(s). For example, a mobile platform can track its location throughout the day to find clusters of locations where the mobile platform can be commonly found, such as work location(s), home location(s), shopping location(s), entertainment location(s), and other location(s). Clustering can be performed using one or more clustering algorithms, such as, but not limited to, connectivity-based clustering, hierarchical clustering, centroid-based clustering, distribution-based clustering, density-based clustering, and partitioning algorithms.

Ranking a set of data items of size S can involve applying a ranking function RF to the S data items and returning the highest (or lowest) N ranked data items, where 0<N≤S. For example, suppose a mobile device has S=200 songs accessible and that have been played. Then, an example data item for each of the S songs can be=(song, count), where "song" identifies the song, and "count" is the number of time that the song has been played. Then, an example ranking function RF1 is to rank the songs based on the count values and present the top N (e.g., N=10) songs. Another example ranking function RF2 can rank the songs based on the count values and present the bottom N songs. Ranking can be performed using one or more ranking algorithms, such as, but not limited to, instance ranking algorithms, label ranking algorithms, subset ranking algorithms, rank aggregation algorithms, bipartite/k-partite ranking algorithms, and learning-to-rank algorithms.

Predicting data can involve determining a predicted value given a previous pattern of values. For example, given that the previous N=20 values were: 1, 2, 1, 2, 1, 2, 1, 2, 1, 2, 1, 2, 1, 2, 1, 2, 1, 2, 1, and 2, the predicted value may be 1. Prediction can be performed using one or more prediction algorithms, such as, but not limited to, minimax, decision tree algorithms, classification tree algorithms, linear regression, polynomial regression, statistical regression, curve fitting, interpolation, and maximum likelihood estimation algorithms.

In the context of the geofencing problem, the machine-learning system can classify environmental data to determine whether the computing device has entered a geofence, exited a geofence, and/or is inside or outside a geofence. One classification system for the machine-learning system can involve using a forest or group of decision trees to the environmental data. First, the forest of decision trees can be trained or provided with training data related to the environment. Once trained, the forest of decision trees can be provided with query data related to the environment. As an example, each decision tree can classify the query data as being data indicating the mobile device is inside the geofence or outside the geofence. Example data that can be included in training data and/or query data include but are not limited to: location data, network-related data (e.g., signal strength information from one or more networks in the environment), temperature data, humidity data, image(s) and light-related data, sound(s) and sound-related data, direction-related data, mapping data, and movement-related data (e.g., velocity values, acceleration values).

The decisions from the decision tree in the forest can be aggregated to make a determination as to whether the mobile device is inside or outside the geofence. Then, the current determination of the machine-learning system can be used to determine whether the computing device has entered, exited, remains inside, or remains outside of the geofence. For example, suppose each decision tree in a forest of NF decision trees (NF>0) outputs a zero value if the data indicates the mobile device is outside the geofence or a one value if the data indicates the mobile device is inside the geofence. Then, let S=the sum the output values from all trees, and indictor I=S/NF. Then, the mobile device can be considered to be within the geofence if I>0.5 (e.g., at least half of the trees in the forest output a one value) and considered outside the geofence when I≤0.5. Many other example aggregation functions are possible as well, including but not limited using a weighted average of the decision tree outputs, aggregating outputs of a subset of decision trees in the forest, and using aggregation functions for multi-valued rather than binary decision trees (e.g., classifying the mobile device as being inside, close to, or outside of the geofence rather than just inside or outside).

In some scenarios, the training data used to train the machine-learning system about geofencing can differ from the query data used in operating the machine-learning system. For example, the training data can include location data for the computing device which is not provided to the machine-learning system in the query. Then, the machine-learning system generates output(s) without receiving location data as inputs, and so, the machine-learning system can classify or otherwise utilize the training data without processing the location data. Rather, the location data can be used to determine if the machine-learning system is trained and/or providing accurate results; e.g., by comparing machine-learning system outputs with a geofencing system that uses location data to determine whether the computing device is inside or outside the geofence. Then, the query data need not include location data, as the location data is not processed by the machine-learning system.

Once trained, the machine-learning system can determine geofencing results without the use of location data, or other data. Any data that is to be excluded from the machine-learning system during operation just has to be excluded from the machine-learning system during training. The excluded data can be used to train the machine-learning system to lead to better results from the machine-learning system. The excluded data can come from devices that may consume a relatively-large amount of power, such as Global Positioning System (GPS) sensors. Additionally, the query data can include data from sensors that require relatively small amounts of resources, or are operating for non-geofencing applications, such as, but not limited to, accelerometers, network interfaces, magnetometers, and/or gyroscopes. Then, the machine-learning system can save mobile device resources used for geofencing by selecting sources of query data that require little (or no) additional resources solely for geofencing.

Example Operations

FIG. 1 is a flow chart of method 100, in accordance with an example embodiment. Method 100 begins at block 110, where a computing device, e.g., mobile device 210 described below, can receive a plurality of geofence-status indications. At least one geofence-status indication of the plurality of geofence-status locations can include training data associated with a geofence at a first location. The geofence can be associated with a geographical area. In some embodiments, the geofence can be further associated with a stationary object. In other embodiments, the geofence can be further associated with a moving object.

At block 120, a geofence-status classifier can be trained to determine a status of the geofence. The geofence-status classifier can be trained by providing the training data as input to the geofence-classifier. The training data can include data for each training feature of a plurality of training features. In some embodiments, the status of the geofence can be selected from at least: (a) a status of being inside the geographical area associated with the geofence and (b) a status of being outside the geographical area associated with the geofence.

At block 130, after the geofence-status classifier is trained, the computing device can receive query data associated with a second location. The query data can include data for each query feature of a plurality of query features. The plurality of query features can include at least one query feature that corresponds to at least one training feature of the plurality of training features. In some embodiments, the query data includes data related to one or more devices operating according to an IEEE 802.11 ("Wi-Fi") standard. In other embodiments, the training data can include more data than the query data. In particular of the other embodiments, the training data can include data related to the first location, and the query data does not include data related to either the first location or the second location.

At block 140, the query can be provided as input to the trained geofence-status classifier.

At block 150, after the query data is provided as input, the trained geofence-status classifier can indicate the status of the geofence.

In some embodiments, the geofence-status classifier can include a decision tree. In other particular embodiments, indicating the status of the geofence using the trained geofence-status classifier can include: arriving at a first node of the decision tree, where the first node is not a terminal node, where the first node can be associated with a first question, and where the first question can have two possible answers; determining an answer to the first question based on one or more inputs; determining whether the answer to the first question is a first answer of the two possible answers; and after determining that the answer to the first question is the first answer, traversing to a second node of the decision tree, where the second node differs from the first node. In more particular embodiments, the trained geofence-status classifier can, after determining that the answer to the first question is not the first answer, traverse to a third node of the decision tree, where the first node, second node, and third node are all different nodes of the decision tree. In even more particular embodiments, the second node and third node can each be terminal nodes, where the second node is labeled with a status of the geofence that differs from a status of the geofence labeling the third node. In other embodiments, a labeled status of the geofence at a terminal sub-classifier of the geofence-status classifier can be selected from at least: (a) a status of being inside the geographical area associated with the geofence and (b) a status of being outside the geographical area associated with the geofence.

In other embodiments, indicating the status of the geofence can include indicating the status of the geofence without determining the second location.

Example Geofences

Figure 2:
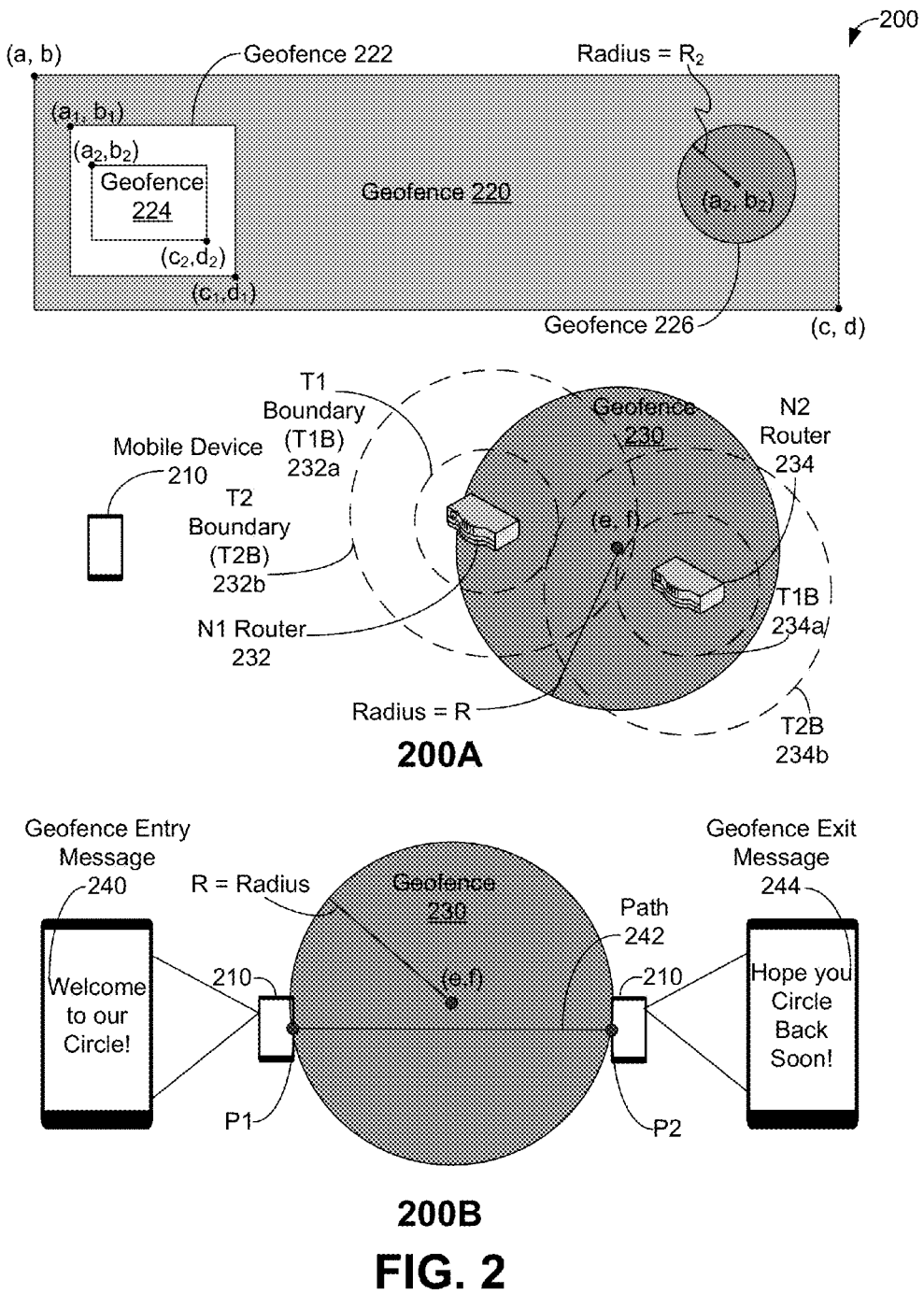
FIG. 2 depicts a geofencing scenario for a mobile device, in accordance with an example embodiment.

FIG. 2 depicts a geofencing scenario 200 for a mobile device 210, in accordance with an example embodiment. At 200A of scenario 200, mobile device 210 is relatively close to five geofences: geofences 220, 222, 224, 226, and 230. Geofences 220, 222, and 224 are shaped as rectangles, and specified in terms of upper-left-hand corner and lower-left-hand corner coordinates. For example, geofence 220 has upper-left-hand corner coordinates of (a, b) and lower-left-hand corner coordinates of (c, d). By this specification, geofence 220 includes all points whose x coordinates range from a to c and whose y coordinates range from b to d.

In some cases, geofences can be nested or included within other geofences. For example, FIG. 2 shows geofences 222 and 226 within geofence 220, and geofence 224 within geofence 222.

Other geometries than rectangles can be used for geofences. FIG. 2 at 200A shows circular geofences 226 and 230 each specified by a respective center point and radius. For examples, geofence 226 is specified with a center point of ($a_2$, $b_2$) and a radius of $R_2$, and geofence 230 is specified with a center point of (e, f) and a radius of R.

At 200B of FIG. 2, mobile device 210 enters geofence 230 at point P1, travels along path 242, and exits geofence 230 at point P2. Mobile device 210 can first determine entry within geofence 230 by determining that (a) it previously was not in geofence 230 and, upon reaching point P1, now is within geofence 230.

For example, mobile device 210 can retain two values for each geofence: a previous entry state and a current entry state. The previous and current entry states can both be initialized to "Not entered". Then, mobile device 210 can determine whether it is within a geofence; e.g., geofence 230, using the techniques mentioned above. If mobile device 210 is within a geofence; e.g., for geofence 230; the mobile device has reached point P1 along path 242; then the current entry state can be set to "Entered"; otherwise, the current entry state can be set to "Not Entered".

Additional information can be determined based on the previous entry state and the current entry state. For example, a machine-learning system can use the information in Table 1 to determine whether the computing device has entered, exited, remains inside or remains outside of a geofence based on the previous and current entry states:

TABLE 1

| Previous Entry State | Current Entry State | Geofence Status |
|---|---|---|
| Entered | Entered | Remains Inside Geofence |
| Entered | Not Entered | Exit from Geofence |
| Not Entered | Entered | Entry into Geofence |
| Not Entered | Not Entered | Remains Outside Geofence |

Upon entry into geofence 230, a geofence entry message can be generated. FIG. 2 shows that mobile device 210 enters geofence 230 at point P1 and so geofence entry message 242 of "Welcome to our Circle!" is generated for display on mobile device 210. Upon exit from geofence 230, a geofence exit message can be generated. FIG. 2 shows that mobile device 210 enters geofence 230 at point P2 and so geofence exit message 244 of "Hope you Circle Back Soon!" is generated for display by mobile device 210.

Example Machine Learning Systems and Structures

Figure 3:
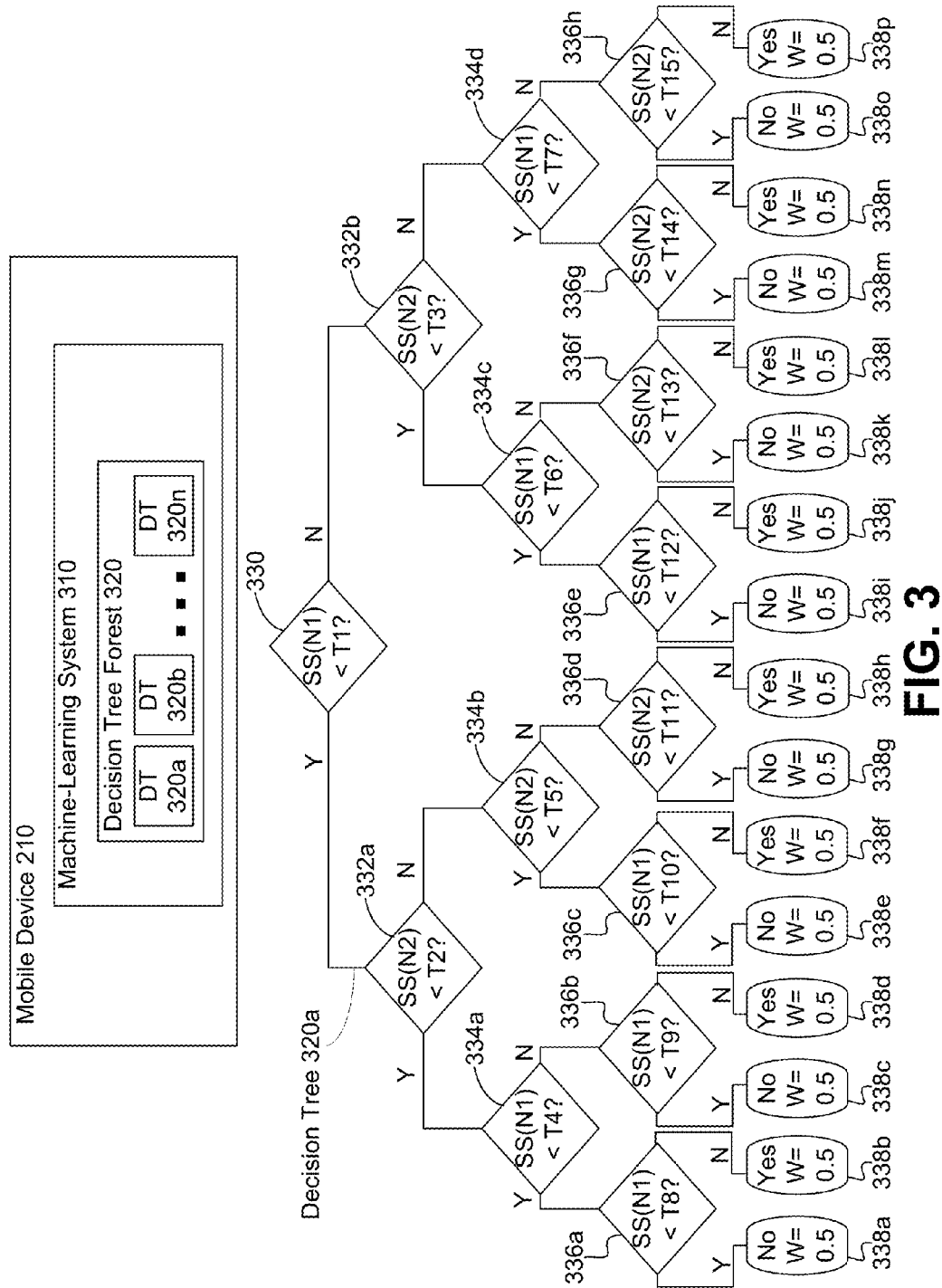
FIG. 3 depicts an example machine-learning system of a mobile device, in accordance with an example embodiment.

FIG. 3 depicts example machine-learning system 310 of a mobile device 210, in accordance with an example embodiment. Machine-learning system 310 is configured to receive training data about geofencing from an environment and generate geofencing information, such as current entry states and geofence statuses, as discussed above in the context of FIG. 2.

One technique for determining the geofencing information is to utilize a classifying machine-learning system, such as machine-learning system 310. In some embodiments, machine-learning system 310 can perform the functionality of a geofencing-status classifier. In other embodiments, other types of machine-learning systems can be used, such as, but not limited to, clustering machine-learning systems, ranking machine-learning systems, predicting machine-learning systems, and combinations of machine-learning systems, including combinations with classifying machine-learning systems.

Machine-learning system 310 can be trained to classify inputs from an environment as either being inputs taken from within a given geofence or outside of a given geofence. One classifier or classification structure that can be used to classify environmental inputs; e.g., training data, query data, for geofencing is decision tree forest 320, which is a group of one or more decision trees. FIG. 3 shows machine-learning system 310 with forest 320 of decision trees 320a, 320b . . . 320n. In some embodiments, forest 320 can have more decision trees or fewer decision trees, as long as forest 320 has at least one decision tree. Other classifiers can be used with or instead of decision trees; e.g., linear classifiers, support vector machines, quadratic classifiers, kernel estimation, neural networks, Bayesian techniques and/or networks, hidden Markov models, binary classifiers, and/or multi-class classifiers.

FIG. 3 shows example decision tree 320a with a root (or top) node (or structure) 330, first level nodes 332a, 332b, second level nodes 334a-334d, third level nodes 336a-336h, and terminal or leaf nodes 338a-338p. Each non-terminal node in decision tree 320a corresponds to a question about the environment. In the specific example of decision tree 320a, each question has a binary answer: either "Y", for yes or "N" for no, as shown in FIG. 3. In some embodiments, questions in a decision tree can be pre-determined; while in other embodiments, questions in the decision tree can randomly generated and/or selected. In other embodiments, some or all of the nodes in a decision tree of forest 320 can correspond to questions with non-binary answers; e.g., n-ary answers for n other than 2.

FIG. 3 shows a decision tree 320a as a full tree; that is, each node has exactly two child or referred-to nodes; e.g., each of nodes 330, 332a, 332b, 334a-334d, and 336a-336h, or has no child nodes. A node without child nodes is called a leaf node. For example, node 332a has exactly two child nodes: 334a and 334b; while leaf node 338b has no child nodes. In some embodiments, some or all of the decision trees in forest 320 are full trees; while in other embodiments, some or all of the decision trees in forest 320 are not full trees. In some cases, a decision tree in forest 320 can begin as a full tree and nodes of the full tree can be removed during training.

Node 330 corresponds to the question "SS(N1)<T1?", which abbreviates the question "Is the input signal strength of network N1 (SS(N1)) less than the value of T1?" The answer to the "SS(N1)<T1?" question is binary—the answer is either yes or no based on the input signal strength for N1. If the input signal strength of network N1 is less than the value of T1, then the "Y" branch of node 320 is taken to reach node 332a of decision tree 320a. Otherwise, the input signal strength of network N1 is not less than the value of T1, and the "N" branch of node 320 is taken to reach node 332b of decision tree 320a.

FIG. 3 shows an example decision tree 320a with each question selected based on random or pseudo-random values. Each question shown in nodes 330, 332a, 332b, 334a-334d, and 336a-336h is of the form:

SS TEST VAL, where SS is a signal strength of either network N1 or a signal strength of network N2, where TEST is a numerical test, shown in FIG. 3 as a "<" symbolizing a less-than test, and where VAL is a numerical value.

Other example questions are possible as well—for example, other values other than signal strength values can be used in the SS position of the above question, such as, but not limited to, time values, temperature values, sound-feature values, landmark-feature values, signage-feature values, and other network-related values. As another example, TEST can be one or more other tests, such as a less-than-or-equal test that can symbolized as ≤, an equality test that can be symbolized as =, a not-equal test that can be symbolized as ≠, a greater-than test that can be symbolized as >, and a greater-than-or-equal test that can be symbolized as ≥. Other tests, such as, but not limited to Boolean value tests, can be used for the TEST.

Additionally, other types of data than numerical values can be used for VAL; for example, if SS is expressed using non-numeric values (e.g., signal strengths as categories, such as "low", "medium", "strong"), then VAL can be a non-numeric value (e.g., a category) and TEST can operate on non-numeric values (e.g., for non-numerical category values, an equality test or a not-equal test can be used).

In still other examples, other forms for questions than SS TEST VAL can be used as well; e.g., multiple questions of the SS TEST VAL form can be combined using Boolean operators such as AND, OR, NOT, NOR, etc. Many other question forms can be used in node(s) decision tree 320a are possible as well.

FIG. 3 shows that each question in decision tree 320a is of the form SS TEST VAL, with TEST being a less-than (<) test for all questions. SS can be selected using a random or pseudo-random number: e.g., a random or pseudo-random value of either 1 or 2 can be selected. If the random or pseudo-random value is 1, then SS can be set to SS(N1); otherwise, the random or pseudo-random value is 2 and SS can be set to SS(N2). Each of T1, T2, T3 . . . T15 shown in FIG. 3 can be a numerical value corresponding to the VAL value discussed above. In other embodiments, the T1-T15 values can be determined using random or pseudo-random numbers.

In even other embodiments, the T1-T15 values can be determined using combination of deterministic techniques and random/pseudo-random values; e.g., T1 can be a random or pseudo-random number selected between 0 and 1/15 and then converted to a percentage; T2 can be a random or pseudo-random number selected between 1/15 and 2/15 and then converted to a percentage; and so on to T15, which can be a random or pseudo-random number selected between 14/15 and 15/15=1 and then converted to a percentage. Other techniques for determining one or more of the values of T1-T15 are possible as well.

In other examples, each question of nodes 330, 332*a*, 332*b*, 334*a*-334*d*, and 336*a*-336*h* can be determined using deterministic technique(s). For example, the signal strengths SS's for the nodes of decision tree 320 can be selected as follows: the questions in nodes 330, 332*a*, 332*b* can refer to SS(N1) and the questions in nodes 334*a*-334*d*, and 336*a*-336*h* can refer to SS(N2). Also, two values T1 and T2 can be selected deterministically; e.g., T1=⅓ and T2=⅔ (or other pre-determined values. The SS's can be selected deterministically; e.g., SS for questions in nodes 330, 332*a*, 332*b* can refer to SS(N1) and SS for questions in nodes 334*a*-334*d*, and 336*a*-336*h* can refer to SS(N2), and on each level TEST can be selected deterministically: the TEST for node 330 can be a less-than test, and the test of each node below node 330 can be selected as follows: if the node is a child node selected in response to a Yes answer, then TEST can be selected as a less-than test; otherwise, the node is a child node selected in response to a No answer, and TEST can be selected as a greater-than test. Other deterministic techniques for determining questions for nodes in decision tree 320*a* are possible as well.

At each successive non-leaf node of decision tree 320*a*, another binary question about the environment can be asked, an answer to the question determined, and either a Y or N branch taken, depending on the answer. For example, at node 336*a*, the question "SS(N1)<T8?" or "Is the signal strength of network N2 less than the value of T8?" with a Yes answer leading to leaf node 338*a*, and a No answer leading to leaf node 338*b*.

FIG. 3A shows that non-leaf nodes in decision tree 320 are about signal strengths of two networks—N1 and N2. In other embodiments, non-leaf nodes can correspond to other and/or different environmental data than signal strengths. For example, non-leaf nodes can have questions corresponding to, but not limited to, timing information, temperature information, visible items (e.g., signs, landmarks), other video/light-related data, and sound-related data.

Each leaf node can correspond to an answer of the question being asked of decision tree 320*a*; e.g., geofencing questions, such as "Is mobile station 210 currently within a given geofence?" For example, leaf node 338*a* indicates that the geofencing question has an answer of "No" with a weight "W" equal to 0.5, while leaf node 338*b* indicates that the geofencing question has an answer of "Yes" with a weight "W" equal to 0.5.

The answers to the question being asked of decision tree(s) in forest 320; e.g., the results provided by leaf nodes of the decision tree, can be pre-determined, purely randomly selected, or otherwise selected; e.g., randomly selected with a pre-determined probability for Yes (or No) answers in the case of a binary decision tree. Similarly, the weights of leaf nodes in a decision tree in forest 320 can be predetermined; e.g., all set to 0.5 as shown in FIG. 3 for nodes 338*a*-338*p* decision tree 320*a*, purely randomly determined, or otherwise determined.

During training, weights of leaf nodes 338*a*-338*p* can be modified based on input training data. For example, suppose mobile device 210 is within a geofence when training data TD1 is collected, and be outside of the geofence when training data TD2 is collected. When training data is presented to a decision tree of forest 320; e.g., decision tree 320*a*, during training of the decision tree, the result provided by the decision tree can be compared to the actual result. Continuing the example, if training data TD1 is provided to tree 320*a* and leaf node 338*e* is reached, the result provided by tree 320*a* would be "No", while the actual result would be "Yes". Then, since the answer is incorrect in this case, the weight of leaf node 338*e*, which provided the incorrect answer, can be reduced, perhaps subject to a minimum value, to indicate that the probability of providing a correct answer is reduced.

In some embodiments, weights can range from 0 to 1; while in other embodiments, weights can range from −1 to 1, where negative weights can be interpreted as changing the binary answer (e.g., from "No" to "Yes" for node 338*e*). The weight for the changed answer can be based on the negative weight; e.g., the changed answer weight can be the absolute value of the negative weight or the sum of +1 and the negative weight.

If the correct result is provided by the leaf node, the weight for the correct leaf node can be incremented, perhaps up to a maximum value; e.g., +1. In some embodiments, increments and/or decrements can have pre-determined values; e.g., always increment or decrement the weight by 0.01, a proportional value; e.g., increment or decrement the weight by 2% of the initial value of the weight, a random value, differing values depending on training data, etc. In other embodiments, weights can be adjusted by other techniques than the incrementing/decrementing techniques described herein; e.g., set to pre-determined values upon success or failure, use of ranges instead of single values for weights, using values based on node performance, or other techniques.

For a node performance example, suppose a node NN provides an answer for the decision tree N>0 times, with S successes and F failures, and so N=S+F. The weight W for node NN can be set to W=((w1*S)−(w2*F))/N, where w1 is a success scaling factor, and w2 is a failure scaling factor, where w1, w2 are in the range [0, 1]. Then, for the specific case with w1=w2=1, W=(S−F)/N=(S−(N−S))/N=(2S−N)/N=2S/N−1, and so only success and total counts need be tracked to determine a weight based on node performance. Many other weighting techniques are possible as well.

Once the decision trees in forest 320 are trained, machine-learning system 310 can be provided with query data to answer geofencing questions using the trained decision trees 320*a* . . . 320*n*. In some embodiments, forest 320 can be subdivided based on specific geofencing questions; e.g., a first set of one or more trees in forest 320 can answer in-or-out questions for a first geofence, a second set of one or more tree in forest 320 can answer in-or-out questions for a second geofence that differs from the first geofence, and so on. Then, by providing query data, to all subdivisions of forest 320 at the same time, answers for multiple geofencing questions can be provided based on the same query data.

In some embodiments, training data used to train trees in forest 320 can be the same as query data used to utilize trees in forest 320. In other embodiments, training data and query data can differ. For example, training data can include additional data, such as, but not limited to, geofencing answers; e.g., mobile device 210 is inside (or outside) a particular geofence, location data; e.g., mobile device 210 is at (latitude, longitude), and/or geofence specifications; e.g., the particular geofence is a circle of radius R centered at (latitude1, longitude1). The additional data can be excluded from forest 320 during training; rather, the additional data can be used to check results of trees in forest 320. As such, trees in forest 320 can be trained on a subset of the training data; e.g., a subset that corresponds to data available as query data.

Example Geofencing Scenarios

Figure 4A:
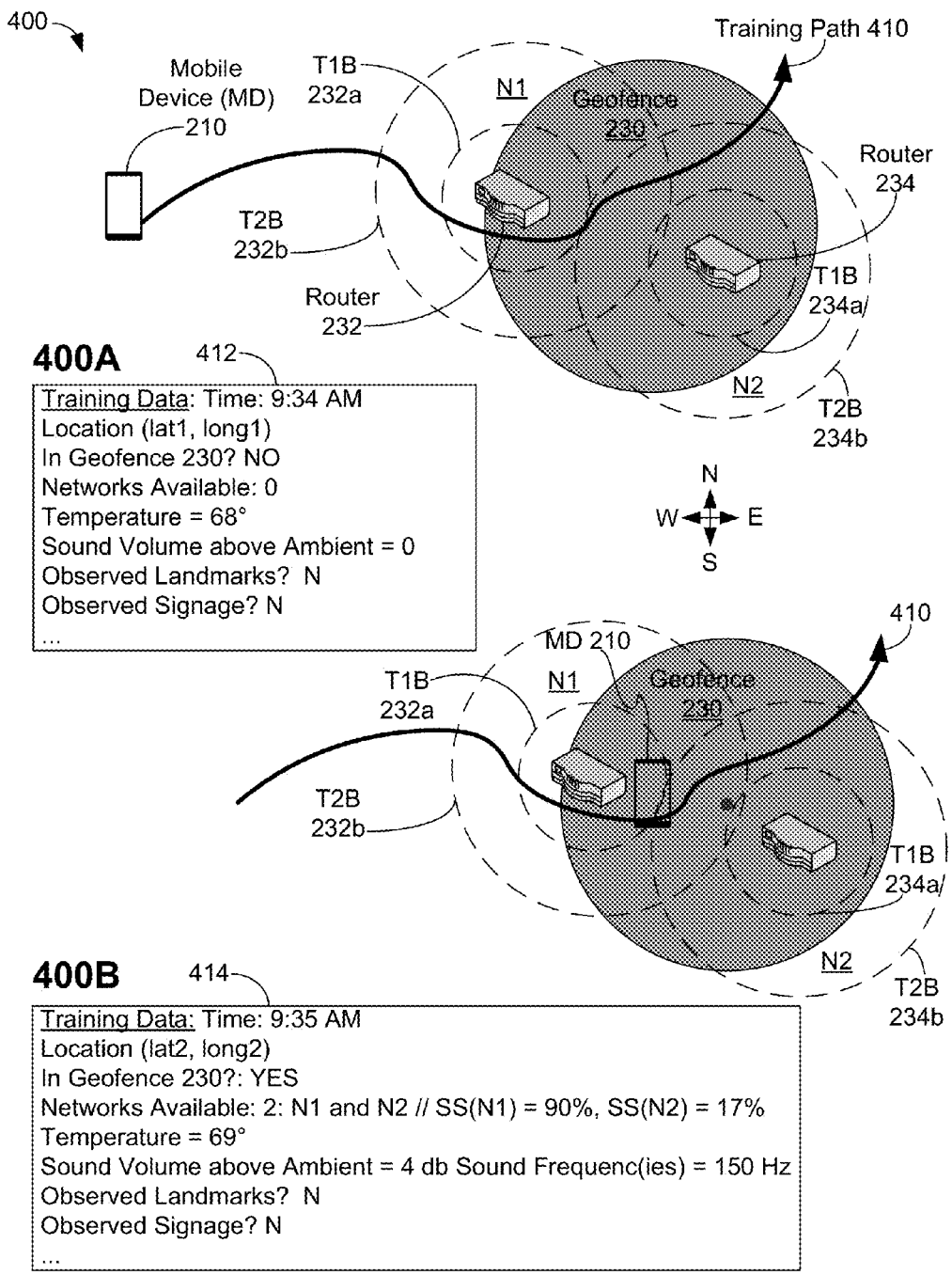
FIGS. 4A and 4B depict a scenario for training and using machine-learning systems in geofencing related to a static environment, in accordance with an example embodiment.
Figure 4B:
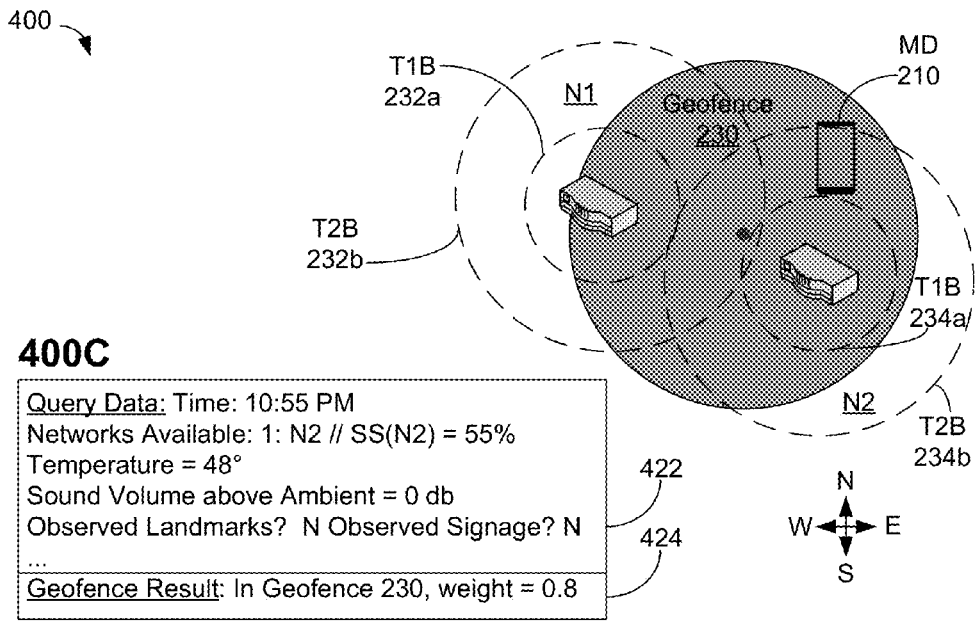
Figure 4B:
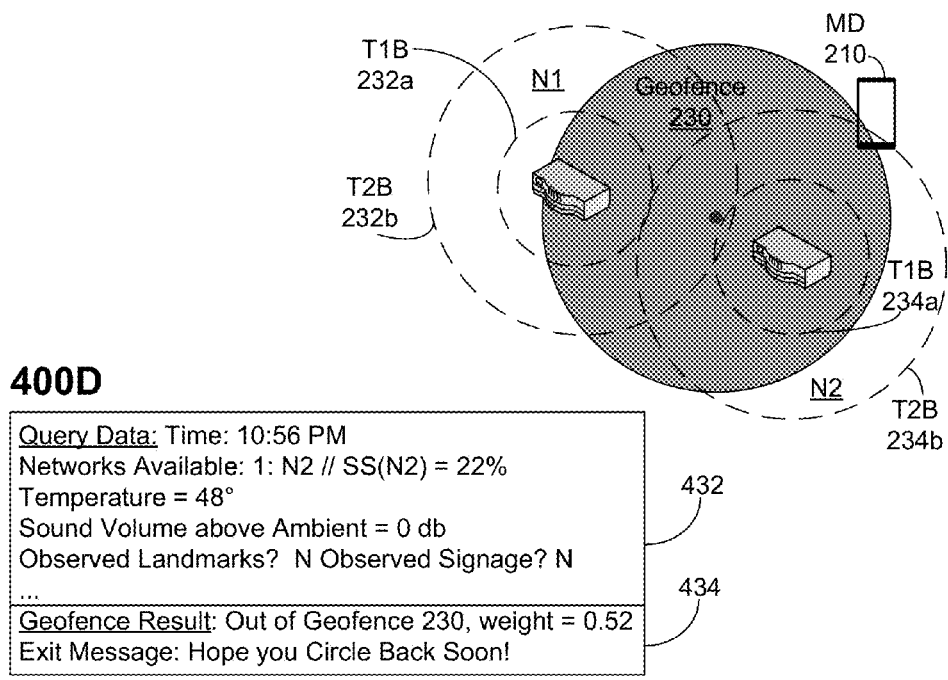

FIGS. 4A and 4B depict scenario 400 for training and using machine-learning system in geofencing related to a static environment, in accordance with an example embodiment. FIG. 4A shows that scenario 400 begins at 400A, where machine-learning system 310 of mobile device (MD) 210 is being trained to answer geofencing questions about geofence 230 by walking along training path 410 to obtain training data. Training path 410 starts to the west of geofence 230, continues through geofence 230 in a general southwest-to-northeast direction, and ends just east of the northernmost portion of geofence 230.

FIG. 4A also shows two Wireless Local Area Networks (WLANs) N1 and N2 operating in the vicinity of geofence 230. Network N1 is provided by router 232 and has a threshold signal strength greater than a predetermined value T1 within T1 boundary (T1B) 232a, and greater than a predetermined value T2 within T2 boundary (T2B) 232b, with T1>T2. For example, T1 can be selected from a range of 70 to 80% of a maximum signal strength for network N1 and T2 can be selected from a range of 20 to 30% of the maximum signal strength for N1. FIG. 4A shows T1 boundary 234a and T2 boundary 234b of network N2, which is provided by router 234.

At 400A, mobile device 210 is at the beginning of training path 410 and, at that location, collects training data 412. FIG. 4A shows training data 412 with a time of "9:34 AM", a temperature of 68°, and a location of "(lat1, long1)" specifying a latitude whose value is "lat1" and a longitude whose value is "long1". Training data can be associated with training features; in this example, a training feature of time can be associated with the data of "9:34 AM", a training feature of location can be associated with the data "(lat1, long1)", and a training feature of temperature can be associated with the data of "68°". Training data 412 also has an in-geofence training feature with data indicates that mobile device 210 is not within geofence 230, a networks-available training feature with data indicating there are no networks available for use by mobile device 210, and a sound training feature with data indicating that no sound volumes above ambient or background levels were detected. Additionally, training data 412 includes data for a landmarks training feature and a signage training feature that indicate no landmarks or signs were observed by mobile device 210. In some embodiments, more, fewer, and/or different training features can have data in training data than indicated for training data 412.

At 400B of scenario 400, mobile device 210 collects training data 414 at a location along path 410 within geofence 320 that is close to an intersection of the T1 boundary of network N1 and the T2 boundary of network N2. FIG. 4A shows training data 414 for the time training feature with a value of "9:35 AM", for the temperature training feature with a value of 69°, and for the location training feature with a value of "(lat2, long2)". Training data 414 also has data for the in-geofence training feature that indicates that mobile device 210 is within geofence 230 and for the networks-available training feature that two networks are available to mobile device 210: network N1 with a signal strength (SS(N1)) of 90% of maximum and network N2 with a signal strength (SS(N2)) of 17% of maximum. At 400B, training data 414 for the sound training feature indicates mobile device 210 detected a 150 Hz frequency sound with a volume of 4 decibels (dB). Additionally, training data 414 for the landmarks and signage training features indicate no landmarks or signs were observed by mobile device 210.

Scenario 400 continues by collecting training data 412 and 414 (and perhaps additional training data). After all training data is collected for scenario 400, machine-learning service 310 of mobile device 210 can be trained to answer geofencing questions about geofence 230. In scenario 400, the training data used to train machine-learning system 310 and query data for utilizing machine-learning system 310 can include at least the information shown in FIGS. 4A and 4B, and perhaps other or different data. The training data can be obtained by one or more person(s) carrying device(s) to obtain the training data while on or near path 410 and/or other locations/paths in or near geofence 230, by device(s) in vehicle(s) traveling on or near path 410 and/or other locations/paths in or near geofence 230 and/or by combinations thereof In scenario 400, training data can be used to train machine learning system 310 to provide information about statuses of geofence 230 at fixed locations on or near geofence 230 and/or for moving objects, such as moving persons and/or vehicles, traveling on or near geofence 230. In some scenarios related to scenario 400, machine-learning system 310 can include a forest of decision trees, such as forest 320, configured to be trained on training data, such as but not limited to training data 412, 414 and receive query data, such as but not limited to query data 422, 432 to determine and provide geofencing results, such as, but not limited to, geofencing results 424, 434.

In particular of these scenarios, forest 320 can include at least one decision tree configured to determine answers to geofencing questions based on provided query data, such as but not limited to data about network statuses, data about temperatures, time-related data, sound-related data, and/or data about visible objects (e.g., signs, landmarks). As one example, as some network signals can be obtained in some but not all locations in geofence 230, e.g., signals from network N1 or N2, a decision tree may have at least one node related to network-signal strength data obtained as observational data.

As shown in FIG. 4B, scenario 400 then proceeds to 400C, where mobile device 210 is at a location within geofence 230 and is presented with query data 422. Query data 422 indicates that at a time of "10:55 PM", the temperature is "48°" and one network is available to mobile device 210—network N1 with a signal strength of 55% of maximum. Query data can be associated with query features: in this example, a query feature of time can be associated with the data of "10:55 PM", a query feature of temperature can be associated with the data "48°", and a query feature of networks-available can be associated with the above-mentioned data about network N1 having a 55% signal strength. Query data 422 also includes data about a sound query feature, a landmark query feature, and a signage query feature that respectively indicate that no sounds about background noise levels, no landmarks, and no signs have been detected by mobile device 210 at its current location.

Query data can be related to the same, more, fewer, and/or different query features than training features related to training data. For examples, query data 422 includes a time query feature and training data 412 includes a corresponding time training feature, but training data 412 includes a location training feature but query data 422 does not include a corresponding location query feature. Many other examples are possible as well.

At 400C, upon being presented with query data 422, machine-learning system 310 of mobile device 210 can generate a result about geofence 230, such as geofence result 424. FIG. 4B shows geofence result 424 of "In Geofence 230" with a "weight" of "0.8", indicating that machine-learning system 310 has determined that mobile device 210 at 400C is within geofence 230.

In scenario 400, machine-learning system 310 provides weight values for a geofencing result in the range of 0.0 to 1.0, where a value of 0.0 indicates that the result is certainly inaccurate and 1.0 indicates the result is certainly accurate; e.g., a value of 0.51 indicates the result is more likely to be accurate than inaccurate. Having the weight for geofence result 424 equal to 0.8 indicates geofence result 424 is more likely to be accurate than inaccurate.

Scenario 400 proceeds to 400D, shown in FIG. 4B, where mobile device 210 is at an edge of geofence 230 and is presented with query data 432. Query data 432 includes data about the time query feature indicating a time of "10:56 PM", data about the temperature query feature indicating a temperature of "49°", and the network-availability query feature regarding one network is available to mobile device 210— network N2 with a signal strength of 22% of maximum. Query data 432 also includes data about the sound query feature, the landmark query feature, and the signage query feature that respectively indicates that no sounds about background noise levels, no landmarks, and no signs have been detected by mobile device 210 at its current location.

At 400D, upon being presented with query data 432, machine-learning system 310 of mobile device 210 can generate a result, such as geofence result 434. FIG. 4B shows geofence result 434 of "Out of Geofence 230" with a "weight" of "0.52", indicating that machine-learning system 310 has determined that mobile device 210 at 400D has likely, but not certainly left geofence 230. Geofence result 434 also includes an "Exit Message" of "Hope you Circle Back Soon!" to indicate that mobile device 210 has just exited geofence 230. For example, machine-learning system 310 and/or mobile device 210 can determine that mobile device 210 has just exited geofence 230 using the previous entry state/current entry state technique discussed above in the context of Table 1 and FIG. 2. After mobile device 210 provides geofence result 434, scenario 400 can end.

Figure 5A:
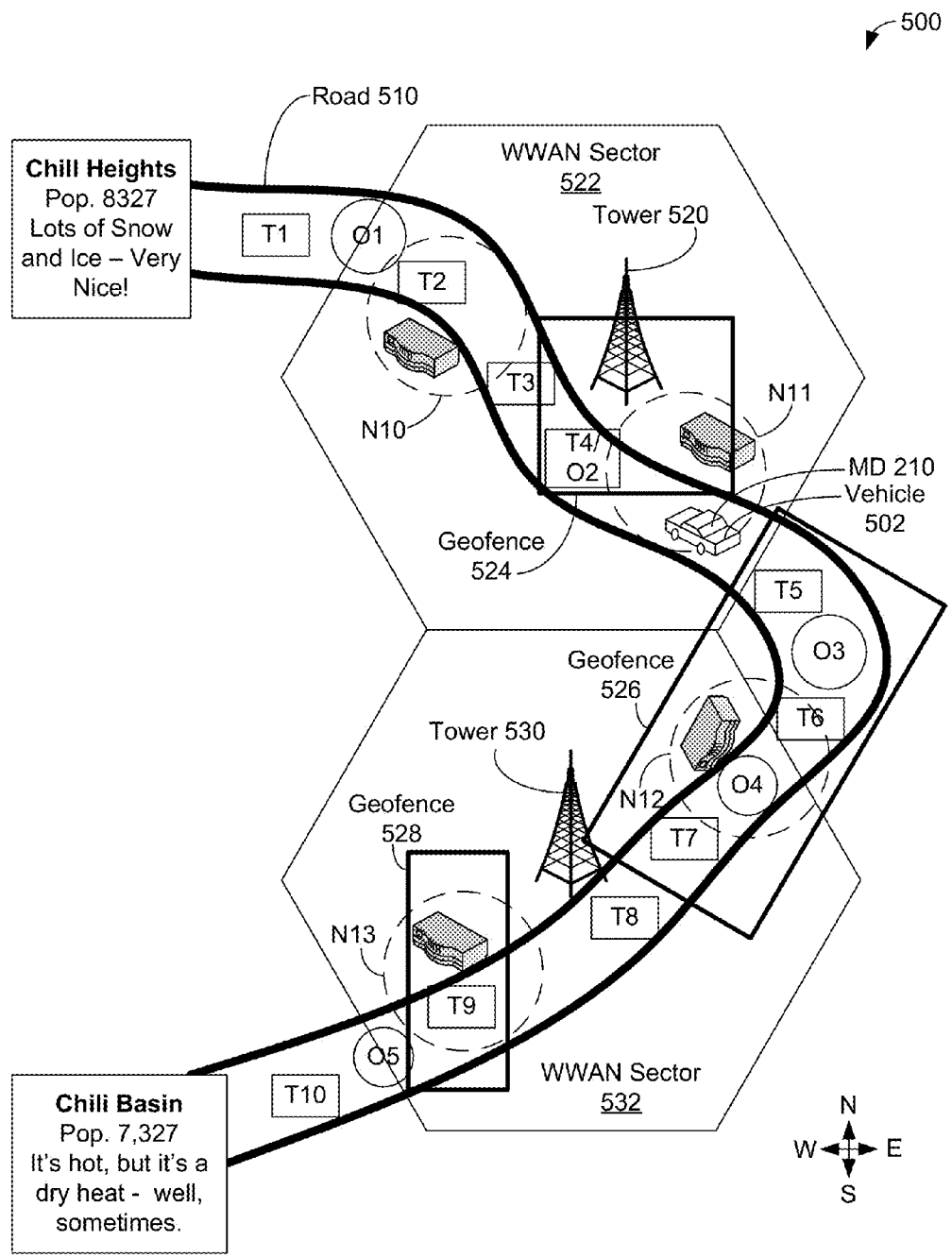

FIGS. 5A, 5B, and 5C depict scenario 500 for training and using machine-learning system in geofencing related to a moving object, in accordance with an example embodiment. In scenario 500, machine-learning system 310 of mobile device 210 is first being trained to answer geofencing questions while traveling in vehicle 502 on road 510. In some cases, mobile device 210 is separate from the vehicle; e.g., a smart phone or other mobile device typically carried by a driver or passenger of the vehicle. In other cases, mobile device 210 is an integral part of the vehicle; e.g., mobile device 210 is part or all of a communication system mounted aboard the vehicle.

FIG. 5A shows road 510 starting at "Chill Heights" and ending at "Chili Basin" with intervening training locations T1, T2, T3, T4, T5, T6, T7, T8, T9, and T10 and observation points O1, O2, O3, O4, and O5. Road 510 goes through two hexagonally-shaped Wireless Wide Area Network (WWAN) sectors: WWAN sector 522, provided by tower 520, and WWAN sector 532, provided by tower 530. FIG. 5A shows that road 510 also passes through four Wireless Local Area Networks (WLANs): N10, which is near location T2; N11, which is near location T4/O2; N12, which intersects both T6 and T7; and N13, surrounds location T9. Each WLAN is shown in FIG. 5A using a dashed-line to depict a boundary of the WLAN; e.g., a T2 boundary, such as discussed above in the context of scenario 400.

Additionally, in the environment of road 510, the air temperature going from Chill Heights to Chili Basin can gradually increase along the way to Chili Basin; e.g., it is not uncommon for temperatures at the same time to be in the 40° F. range at Chill Heights, about 60° F. at location T6, and approximately 80° F. range at Chili Basin.

In scenario 500, training data for machine-learning system 310 of mobile device 210 is obtained from at least some of training locations T1-T10. In some cases, the training data can be obtained during one trip along road 510 from Chill Heights to Chili Basin. In other cases, the training data can be obtained during multiple trips along road 510 from Chill Heights to Chili Basin. In still other cases, the training data can be obtained during at least one trip along road 510 from Chili Basin to Chill Heights; e.g., traveling on road 510 in T10, T9, T8 . . . T1 order.

Scenario 500 continues by collecting training data 540, 542, 544, 546 and perhaps additional training data. FIG. 5B shows example training data 540, 542, 544, 546, for machine-learning system 310 of mobile device 210 from one trip from Chill Heights to Chili Basin taken at four respective locations: T2, T5, T8, and T9.

FIG. 5B shows training data 540 with a time of "7:35 AM", a temperature of 45°, and a location of "(lat(T2), long(T2))", which indicates a latitude of training location T2 "lat(T2)" and a longitude of training location T2 "long(T2)"—that is, training data 540 was obtained at training location T2. Training data 540 also indicates that, at training location T2, mobile device 210 is not within a geofence and that mobile device 210 can access two networks: WWAN and WLAN N10. Training data 540 shows that mobile device 210 is in sector 522 of WWAN and recorded a "power" or signal strength of 50%, and that mobile device 210 recorded a signal strength for network N10 of 50%. Also, training data 540 indicates that mobile device 210, at training location T2, did not detect any sounds above ambient volume, any landmarks, or any signs. As discussed above in the context of FIG. 4A, training data 540, 542, 544, 546 can be associated with training features, such as the time training feature, temperature training feature, the location training feature, the in-geofence training feature, the networks-available training feature, the sound training feature, and the landmarks and signage training features as shown in FIG. 5A.

FIG. 5B shows training data 542 with a time of "7:42 AM", a temperature of 55°, and a location of "(lat(T5), long(T5))" corresponding to training location T5. Training data 542 also indicates that, at training location T5, mobile device 210 is within geofence 526 and that mobile device 210 cannot access a network. Also, training data 542 indicates that mobile device 210, at training location T5, did not detect any sounds above ambient volume, any landmarks, or any signs.

FIG. 5B shows training data 544 with a time of "7:51 AM", a temperature of 69°, and a location of "(lat(T8), long(T8))" for training location T8. Training data 544 also indicates that, at training location T8, mobile device 210 is not within a geofence and that mobile device 210 is in sector 532 of WWAN and recorded a signal strength of 90%. Also, training data 544 indicates that mobile device 210, at training location T2, did not detect any sounds above ambient volume, any landmarks, or any signs.

Training data 546 has a time of "7:55 AM", a temperature of 72°, and a location of "(lat(T9), long(T9))" that corresponds to training location T9. Training data 546 also indicates that, at training location T9, mobile device 210 is within geofence 528. At T9, mobile device 210 is in sector 532 of WWAN and recorded a signal strength of 90% and mobile device 210 is network N13 with a corresponding signal strength of 70%. Also, training data 546 indicates that mobile device 210, at training location T2, did not detect any sounds above ambient volume, any landmarks, or any signs.

After all training data is collected, scenario 500 can continue by training machine-learning service 310 of mobile device 210, using the collected training data, to answer geofencing questions about geofences along road 510. After machine-learning system 310 is trained, query data can be presented so that machine-learning system 310 can answer geofencing questions. The training data and query data can include at least the information shown in respective FIGS. 5B and 5C, and perhaps other or different data. The training data can be obtained by one or more person(s) carrying device(s) to obtain the training data while on or near road 510, by device(s) in vehicle(s) traveling on or near road 510, and/or by combinations thereof.

In some scenarios, machine-learning system 310 can determine, after training, information about statuses of geofences along road 510; e.g., geofences 524, 526, 528. In some cases, the information about statuses of geofences along road 510 can be about a specific location or region; e.g., observational point O1. In other scenarios, the information about statuses can be about persons and/or vehicles on or near road 510; for example, the training data obtained at training locations T1-T10 at one or more times, and perhaps other locations, can be obtained by devices used by the person(s) and/or in the vehicle(s).

In some scenarios related to scenario 500, machine-learning system 310 can include a forest of decision trees, such as forest 320, configured to be trained on training data, such as but not limited to training data 540, 542, 544, 546 and receive query data, such as but not limited to query data 550, 554, 560, 564 to determine and provide geofencing results, such as, but not limited to, geofencing results 552, 556, 562, 566.

In particular of these scenarios, forest 320 can include at least one decision tree configured to determine answers to geofencing questions based on provided query data, such as but not limited to data about network statuses, data about temperatures, time-related data, sound-related data, and/or data about visible features (e.g., signs, landmarks). As one example, as some network signals can be obtained in some but not all locations along road 510, e.g., signals from network N10 or WWAN, so a decision tree may have at least one node related to network-signal strength data obtained as observational data. As another example, as temperatures generally increase while going south along road 510 (or, said another way, generally decrease going north along road 510), a decision tree may have at least one node related to temperatures obtained as part of observational data.

FIG. 5C shows example query data 550, 554, 560, 564 from one trip from Chili Heights to Chili Basin taken at four respective observation points O1, O2, O4, and O5, and corresponding respective geofencing results 552, 556, 562, 566 generated by trained machine-learning system 310. FIG. 5C shows query data 550 has a time of "7:32 AM" and a temperature of 42°. At observation point O1, mobile device 210 is in sector 522 of WWAN and recorded a signal strength of 20% and mobile device 210 is network N10 with a corresponding signal strength of 10%. Also, query data 550 indicates that mobile device 210, at observation point O1, did not detect any sounds above ambient volume, any landmarks, or any signs.

As discussed above in the context of FIG. 4B, query data 550, 554, 560, and 564 can be associated with query features, such as the time query feature, temperature query feature, the networks-available query feature, the sound query feature, and the landmarks and signage query features as shown in FIG. 5B.

Upon being presented with query data 550, machine-learning system 310 of mobile device 210 can generate a result, such as geofence result 552. FIG. 5C shows geofence result 552 of "Not in Geofence" with a "weight" of "0.95". In scenario 500, machine-learning system 310 provides weight values for a geofencing result in the range of 0.0 to 1.0, where a value of 0.0 indicates that the result is certainly inaccurate and 1.0 indicates the result is certainly accurate; e.g., a value of 0.51 indicates the result is more likely to be accurate than inaccurate. Having the weight for geofence result 552 equal to 0.95 indicates geofence result 552 is far more likely to be accurate than inaccurate.

FIG. 5C shows query data 554 has a time of "7:37 AM" and a temperature of 48°. At observation point O2, mobile device 210 is in sector 522 of WWAN and recorded a signal strength of 80% and mobile device 210 is network N11 with a corresponding signal strength of 10%. Also, query data 554 indicates that mobile device 210, at observation point O2, did not detect any sounds above ambient volume or detect any signs, while detecting "Tower 520" in a north-northeast "NNE" direction. Upon being presented with query data 554, machine-learning system 310 of mobile device 210 can generate a result, such as geofence result 556. FIG. 5C shows geofence result 556 of "Remaining in Geofence 524" with a "weight" of "0.6".

FIG. 5C shows query data 560 has a time of "7:46 AM" and a temperature of 61°. At observation point O4, mobile device 210 is in sector 532 of WWAN and recorded a signal strength of 40% and mobile device 210 is network N12 with a corresponding signal strength of 90%. Also, query data 560 indicates that mobile device 210, at observation point O4, did not detect any sounds above ambient volume, any landmarks, or any signs. Upon being presented with query data 560, machine-learning system 310 of mobile device 210 can generate a result, such as geofence result 562. FIG. 5C shows geofence result 562 of "Remaining in Geofence 562" with a "weight" of "0.9".

FIG. 5C shows query data 564 has a time of "7:55 AM" and a temperature of 70°. At observation point O5, mobile device 210 is in sector 532 of WWAN and recorded a signal strength of 30%. Also, query data 564 indicates that mobile device 210, at observation point O4, did not detect any sounds above ambient volume, any landmarks, or any signs. Upon being presented with query data 564, machine-learning system 310 of mobile device 210 can generate a result, such as geofence result 566.

FIG. 5C shows geofence result 566 of "Out of Geofence 526" with a "weight" of "0.52". Geofence result 566 also includes an "Exit Message" of "n/a" to indicate that mobile device 210 has just exited geofence 526, but geofence 526 does not provide a message upon exit. For example, machine-learning system 310 and/or mobile device 210 can determine that mobile device 210 has just exited geofence 526 using the previous entry state/current entry state technique discussed above in the context of Table 1 and FIG. 2. After mobile device 210 provides geofence result 566, scenario 500 can end.

Figure 6A:
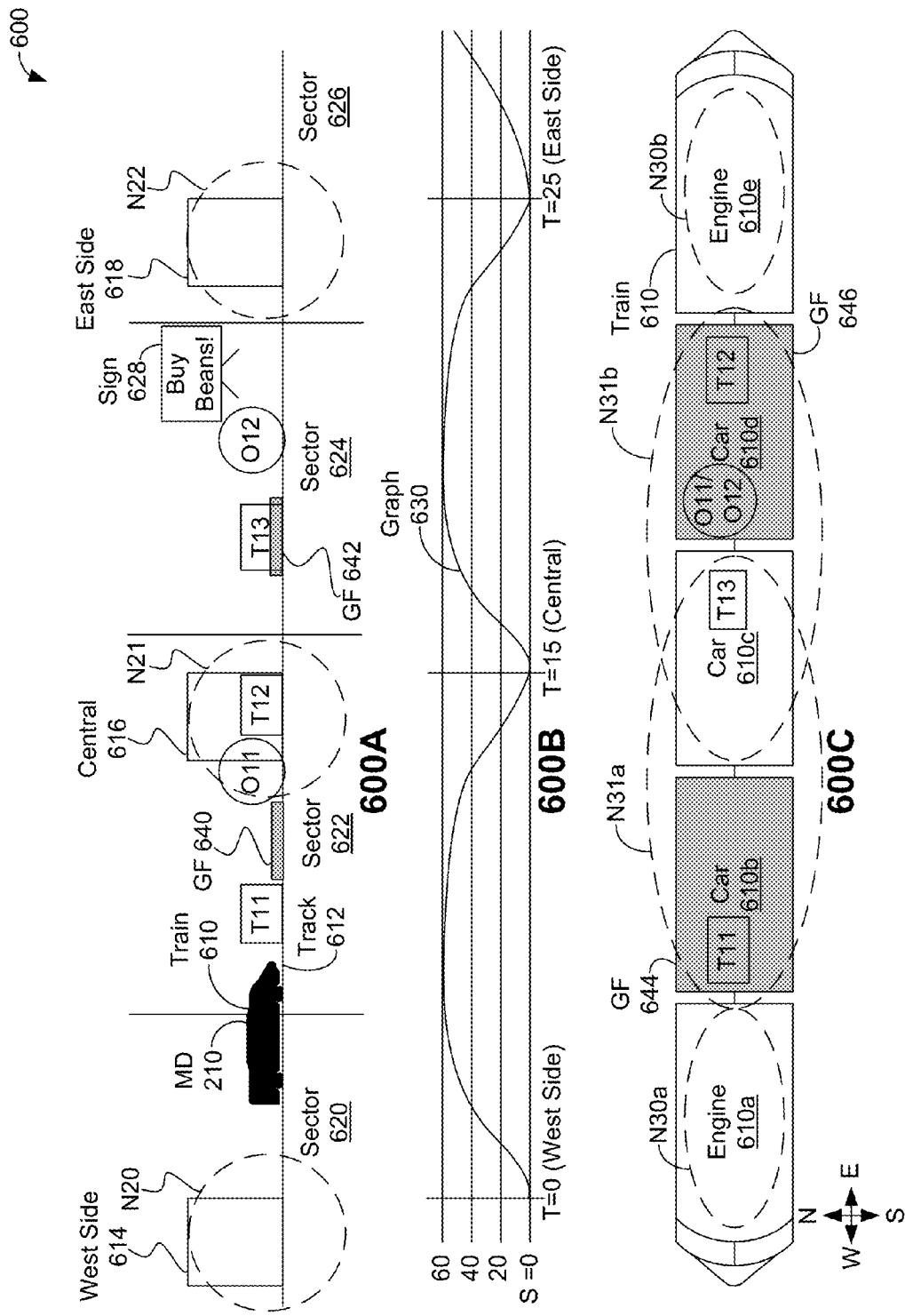
FIGS. 6A and 6B depict a scenario for training and using machine-learning systems in geofencing related to a moving geofence, in accordance with an example embodiment.
Figure 6B:
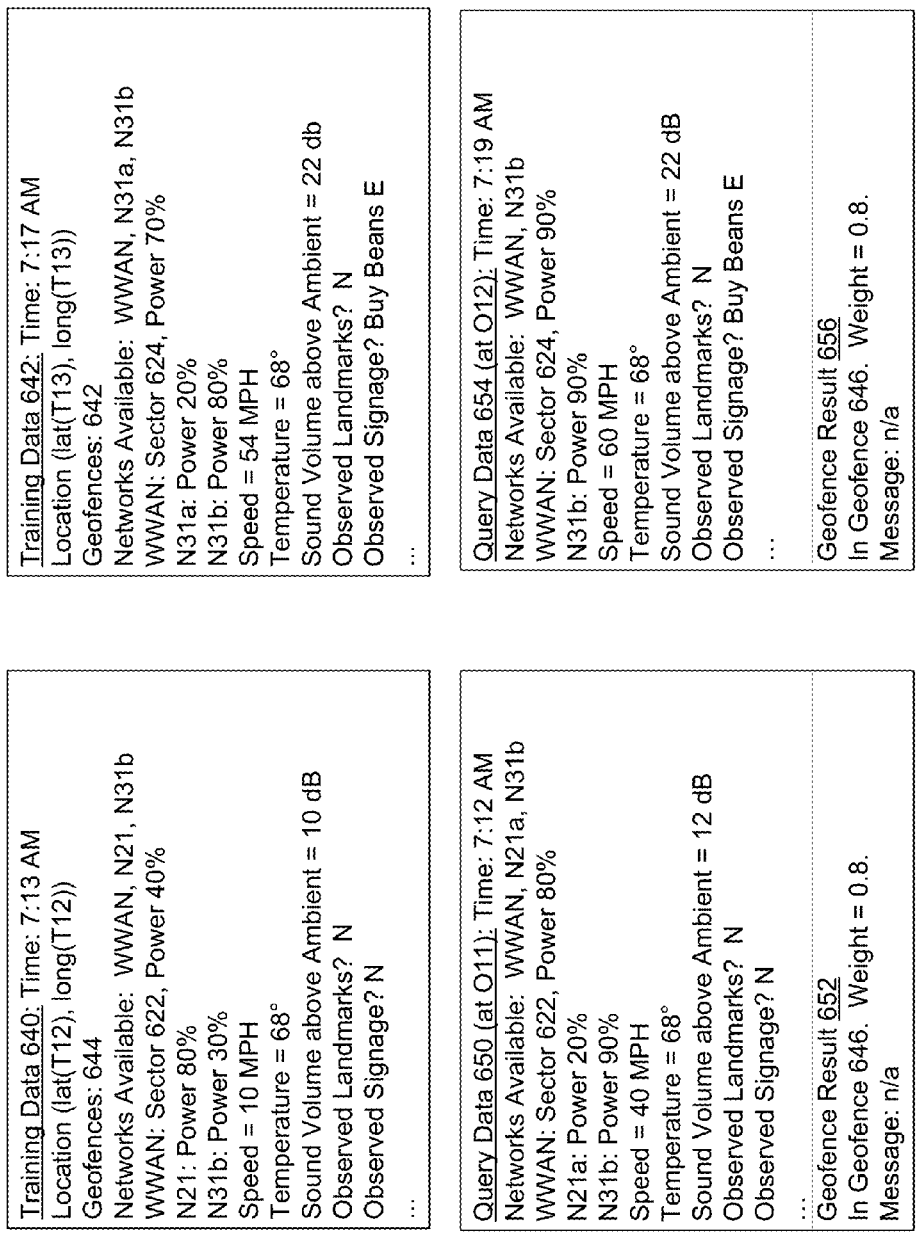

FIGS. 6A and 6B depict scenario 600 for training and using machine-learning systems in geofencing related to a moving geofence, in accordance with an example embodiment. In scenario 600, machine-learning system 310 of mobile device 210 is first being trained to answer geofencing questions for moving geofences 644, 646 on train 610. In some cases, mobile device 210 is separate from train 610; e.g., a smart phone or other mobile device typically carried by a driver or passenger of the vehicle. In other cases, mobile device 210 is an integral part of train 610; e.g., mobile device 210 is part or all of a communication system mounted in train 610. In still other cases, train 610 can have one or more stations aboard to broadcast or rebroadcast WLAN and/or WWAN signals; e.g., train 610 can have a WLAN station aboard for broadcasting WLAN signals to mobile devices also aboard the train.

At 600A of scenario 600, train 610 travels between stations 614 and 618 along track 612, stopping at station 616 along the way, with intervening training locations T11, T12, T13 and observation points O11 and O12. Track 610 goes through four sectors: WWAN sectors 622, 624, 626, and 628. FIG. 6A shows that track 610 also passes through three WLANs: N20, centered on station 614, N21, centered on station 616, and N20, centered on station 618. Each WLAN is shown in FIG. 6A using a dashed-line to depict a boundary of the WLAN; e.g., a T2 boundary, such as discussed above in the context of scenario 400.

In scenario 600, training data for machine-learning system 310 of mobile device 210 is obtained from at least some of training locations T11, T12, and T13. In some cases, the training data can be obtained during one trip aboard train 610 along track 612 from station 614 to station 618. In other cases, the training data can be obtained during multiple trips aboard train 610 along track 612. In still other cases, the training data can be obtained during at least one trip aboard train 610 along track 612 from station 618 to station 614; e.g., traveling on track 612 in T13, T12, T11 order.

At 600B of FIG. 6A, graph 630 graphs a speed of train 610 while traveling along track 612 over time. Graph 630 shows that train 610 increases speed upon leaving station 614 at time T=0 minutes to reach a maximum speed of about 60 miles per hour (MPH) before slowing down on approach to station 516, stopping at time T=15 minutes. Graph 630 shows that train 610 speeds up again upon leaving station 612 shortly after time T=15 minutes to reach a maximum speed of about 60 MPH before slowing down on approach to station 518, stopping at time T=25 minutes.

FIG. 6A at 600C shows details of train 610, including engines 610a, 610e and cars 610b, 610c, and 610d, networks N30a, N30b, N31a, N31b, geofence 644 which covers car 610b, and geofence 646 which covers car 610d. In scenario 600, networks N30a and N30b are for use solely while in respective engines 610a, 610b, and networks N31a and N31b are for use in cars 610b, 610b, and 610c. FIG. 6A also shows that train 610 has training location T1 in car 610b, training location T2 in car 610d, and training location T3 and car 610c, and observation location O1 and O2 in car 610d; that is, mobile device 210 remains in (roughly) the same location while at O1 and at O2.

Scenario 600 continues by collecting training data 640, 642 and perhaps additional training data. FIG. 6B shows example training data 640, 642 for machine-learning system 310 of mobile device 210 from one trip aboard train 610 from station 614 to station 618, taken at four respective locations: T12 and T13.

FIG. 6B shows training data 640 with a time of "7:13 AM", a temperature of 68°, and a location of "(lat(T12), long (T12))" as training data 640 was obtained at training location T12 while train 610 was moving at a speed of 10 MPH. Training data 640 also indicates that, at training location T2, mobile device 210 is within geofence 644 and that mobile device 210 can access three networks: WWAN and WLANs N21 and N31b. Training data 640 shows that mobile device 210 is in sector 622 of WWAN and recorded a signal strength of 40%, and that mobile device 210 recorded a signal strength for network N21 at 80% and a signal strength for network N31b of 30%. Also, training data 640 indicates that mobile device 210, at training location T12, detected sounds at 10 dB above ambient volume but did not detect any landmarks or signs.

FIG. 6B shows training data 640 with a time of "7:13 AM", a temperature of 68°, and a location of "(lat(T12), long (T12))" as training data 640 was obtained at training location T12 while train 610 was moving at a speed of 10 MPH. Training data 640 also indicates that, at training location T2, mobile device 210 is within geofence 644 and that mobile device 210 can access three networks: WWAN and WLANs N21 and N31b. Training data 640 shows that mobile device 210 is in sector 622 of WWAN and recorded a signal strength of 40%, and that mobile device 210 recorded a signal strength for network N21 at 80% and a signal strength for network N31b of 30%. Also, training data 640 indicates that mobile device 210, at training location T12, detected sounds at 10 dB above ambient volume but did not detect any landmarks or signs.

FIG. 6B shows training data 642 with a time of "7:17 AM", a temperature of 68°, and a location of "(lat(T13), long (T13))" as training data 642 was obtained at training location T13 while train 610 was moving at a speed of 54 MPH. Training data 642 also indicates that, at training location T13, mobile device 210 is within geofence 642 and that mobile device 210 can access three networks: WWAN and WLANs N31a and N31b. Training data 642 shows that mobile device 210 is in sector 624 of WWAN and recorded a signal strength of 70%, and that mobile device 210 recorded a signal strength for network N31a at 20% and a signal strength for network N31b of 80%. Also, training data 642 indicates that mobile device 210, at training location T13, detected sounds at 22 dB above ambient volume and a sign "Buy Beans" in the east, but did not detect any landmarks.

After all training data is collected, scenario 600 can continue by training machine-learning service 310 of mobile device 210, using the collected training data, to answer geofencing questions about geofences inside train 610. After machine-learning system 310 is trained, query data can be presented so that machine-learning system 310 can answer geofencing questions. The training data and query data can include at least the information shown in FIG. 6B and perhaps other or different data.

In some scenarios, machine-learning system 310 can determine, after training, information about statuses of geofences within train 610 and perhaps along track 612; e.g., geofences 640, 642, 644, 646. In some cases, machine-learning system 310 is trained only about geofences inside train 640, while in other cases; machine-learning system 310 is trained about geofences inside train 640 and along track 612. In some cases, the information about statuses of geofences along track 612 can be about a specific location or region; e.g., observational point O12. In other scenarios, the information about statuses can be about persons and/or vehicles on or near road 610; for example, the training data obtained at training locations T11-T13 at one or more times, and perhaps other locations, can be obtained by devices used within train 610.

In some scenarios related to scenario 600, machine-learning system 310 can include a forest of decision trees, such as forest 320, configured to be trained on training data, such as but not limited to training data 640, 642 and receive query data, such as but not limited to query data 650, 654 to determine and provide geofencing results, such as, but not limited to, geofencing results 652, 656.

In particular of these scenarios, forest 320 can include at least one decision tree configured to determine answers to geofencing questions based on provided query data, such as but not limited to data about network statuses, data about temperatures, time-related data, sound-related data, velocities, speeds, and/or data about visible features (e.g., signs, landmarks). As one example, as some network signals can be obtained in some but not all locations along track 612 and/or within train 610, e.g., signals from networks N21, N31 a, or WWAN, so a decision tree may have at least one node related to network-signal strength data obtained as observational data. As another example, as speeds aboard train 610 change as indicated in graph 630 while train 610 travels between stations 614 and 618, a decision tree may have at least one node related to speeds, or perhaps velocities, obtained as part of observational data.

FIG. 6B shows example query data 650, 654 from one trip on train 610 from station 614 to station 618 at observational points O11 and O12, and corresponding respective geofencing results 652, 656 generated by trained machine-learning system 310. FIG. 6B shows query data 650 taken aboard train 610 at observational point O11 at a time of "7:12 AM", a temperature of 68°, and data indicating train 610 is traveling at a speed of 40 MPH. At observation point O11, mobile device 210 is in sector 622 of WWAN and recorded a signal strength of 80% and mobile device 210 is WLANs N21a and N31b with respective signal strengths of 20% and 90%. Also, query data 650 indicates that mobile device 210, at observation point O11, detected sounds at 12 decibels (dB) above ambient volume, any landmarks, or any signs.

Upon being presented with query data 650, machine-learning system 310 of mobile device 210 can generate a result, such as geofence result 652. FIG. 6B shows geofence result 652 of "In Geofence 646" with a weight of 0.8. In scenario 600, machine-learning system 310 provides weight values for a geofencing result in the range of 0.0 to 1.0, where a value of 0.0 indicates that the result is certainly inaccurate and 1.0 indicates the result is certainly accurate; e.g., a value of 0.51 indicates the result is more likely to be accurate than inaccurate. Having the weight for geofence result 652 equal to 0.8 indicates geofence result 652 is far more likely to be accurate than inaccurate. As mobile device 210 did not travel across a border of geofence 646 while train 610 is at observation point O11, no geofence message is generated or sent.

FIG. 6B shows query data 654 taken aboard train 610 at observational point O12 at a time of "7:19 AM", a temperature of 68°, and data indicating train 610 is traveling at a speed of 60 MPH. At observation point O12, mobile device 210 is in sector 624 of WWAN and recorded a signal strength of 90% and mobile device 210 is WLAN N31b with a signal strength of 90%. Also, query data 654 indicates that mobile device 210, at observation point O12, detected sounds at 22 decibels (dB) above ambient volume, any landmarks, or any signs.

Upon being presented with query data 654, machine-learning system 310 of mobile device 210 can generate a result, such as geofence result 656. FIG. 6B shows geofence result 654 of "In Geofence 646" with a weight of 0.8. Having the weight for geofence result 656 equal to 0.8 indicates geofence result 656 is far more likely to be accurate than inaccurate. As mobile device 210 did not travel across a border of geofence 646 while train 610 is at observation point O12, no geofence message is generated or sent. After generating geofence result 656, scenario 600 can end.

Example Data Network

Figure 7:
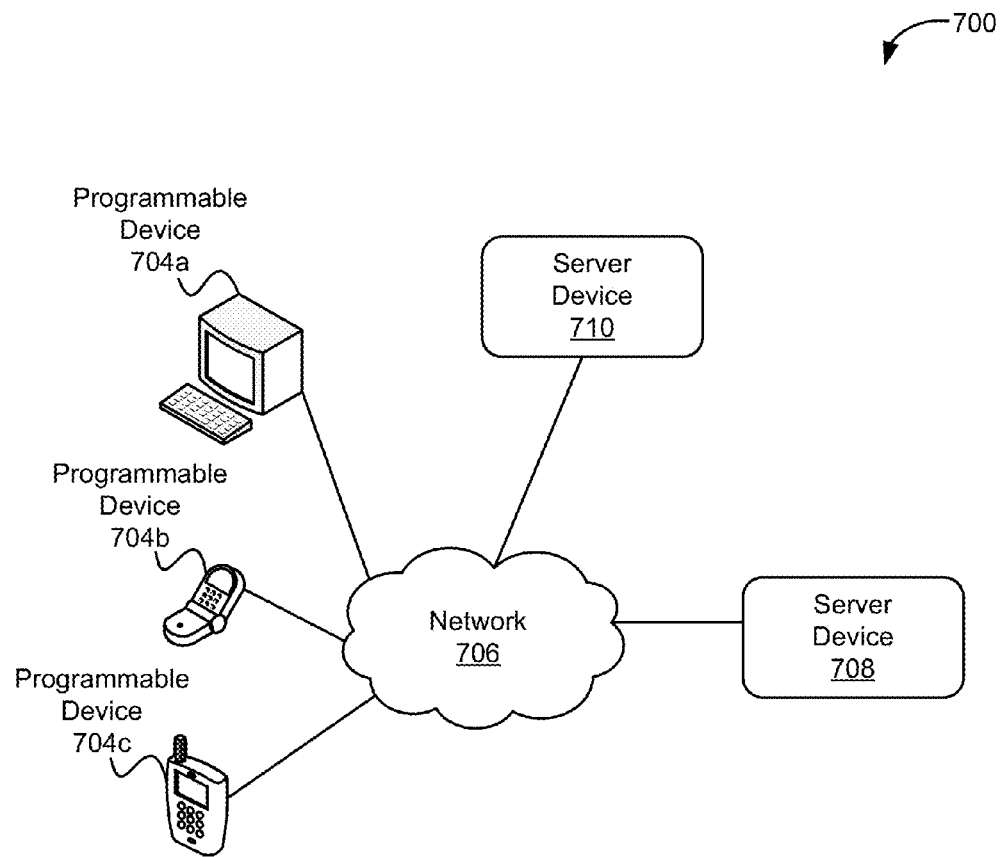
FIG. 7 depicts a distributed computing architecture, in accordance with an example embodiment.

FIG. 7 depicts a distributed computing architecture 700 with server devices 708, 710 configured to communicate, via network 706, with programmable devices 704a, 704b, and 704c, in accordance with an example embodiment. Network 706 may correspond to a LAN, a wide area network (WAN), a corporate intranet, the public Internet, or any other type of network configured to provide a communications path between networked computing devices. The network 706 may also correspond to a combination of one or more LANs, WANs, corporate intranets, and/or the public Internet.

Although FIG. 7 only shows three programmable devices, distributed application architectures may serve tens, hundreds, or thousands of programmable devices. Moreover, programmable devices 704a, 704b, and 704c (or any additional programmable devices) may be any sort of computing device, such as an ordinary laptop computer, desktop computer, network terminal, wireless communication device (e.g., a cell phone or smart phone), and so on. In some embodiments, programmable devices 704a, 704b, and 704c may be dedicated to the design and use of software applications. In other embodiments, programmable devices 704a, 704b, and 704c may be general purpose computers that are configured to perform a number of tasks and need not be dedicated to software development tools. In particular embodiments, the functionality of mobile device 210 can be performed by one or more of programmable devices 704a, 704b, and 704c.

Server devices 708, 710 can be configured to perform one or more services, as requested by programmable devices 704a, 704b, and/or 704c. For example, server device 708 and/or 710 can provide content to programmable devices 704a-704c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 708 and/or 710 can provide programmable devices 704a-704c with access to software for database, search, computation, graphical, audio, video, World Wide Web/Internet utilization, and/or other functions. Many other examples of server devices are possible as well.

Computing Device Architecture

Figure 8A:
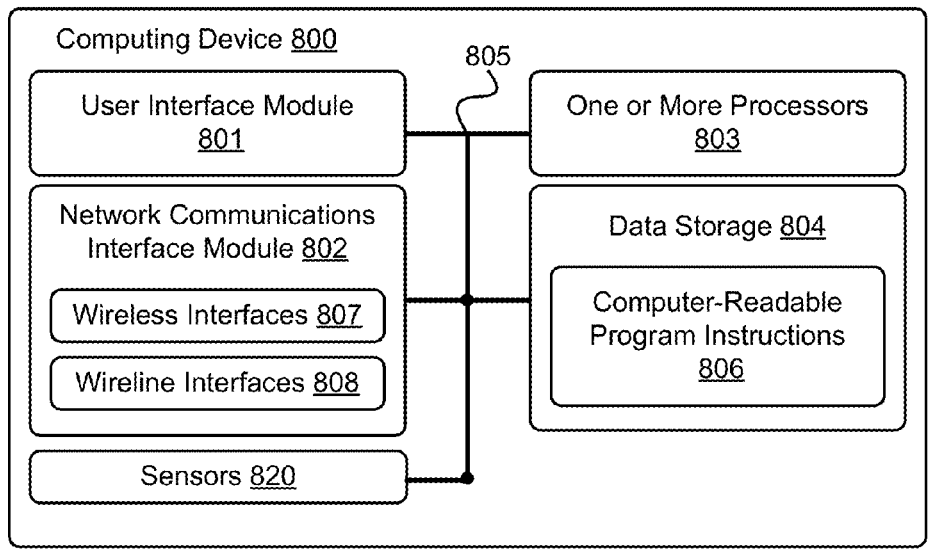
FIG. 8A is a block diagram of a computing device, in accordance with an example embodiment.

FIG. 8A is a block diagram of a computing device 800 (e.g., system) in accordance with an example embodiment. In particular, computing device 800 shown in FIG. 8A can be configured to perform one or more functions of mobile device 210, server devices 708, 710, network 706, and/or one or more of programmable devices 704a, 704b, and 704c. Computing device 800 may include a user interface module 801, a network-communication interface module 802, one or more processors 803, data storage 804, and sensors 820, all of which may be linked together via a system bus, network, or other connection mechanism 805.

User interface module 801 can be operable to send data to and/or receive data from external user input/output devices. For example, user interface module 801 can be configured to send and/or receive data to and/or from user input devices such as a keyboard, a keypad, a touch screen, a computer mouse, a track ball, a joystick, a camera, a voice recognition module, and/or other similar devices. User interface module 801 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 801 can also be configured to generate audible output(s), such as a speaker, speaker jack, audio output port, audio output device, earphones, and/or other similar devices.

Network-communications interface module 802 can include one or more wireless interfaces 807 and/or one or more wireline interfaces 808 that are configurable to communicate via a network, such as network 706 shown in FIG. 7. Wireless interfaces 807 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 808 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 802 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 803 can include one or more general purpose processors and/or one or more special purpose processors (e.g., digital signal processors, application specific integrated circuits, etc.). Processors 803 can be configured to execute computer-readable program instructions 806a that are contained in the data storage 804 and/or other instructions as described herein.

Data storage 804 can include one or more computer-readable storage media that can be read and/or accessed by at least one of processors 803. The one or more computer-readable storage media can include volatile and/or non-volatile storage components, such as optical, magnetic, organic or other memory or disc storage, which can be integrated in whole or in part with at least one of processors 803. In some embodiments, data storage 804 can be implemented using a single physical device (e.g., one optical, magnetic, organic or other memory or disc storage unit), while in other embodiments, data storage 804 can be implemented using two or more physical devices.

Data storage 804 can include computer-readable program instructions 806 and perhaps additional data, such as but not limited to data used by one or more processes and/or threads of a software application. In some embodiments, data storage 804 can additionally include storage required to perform at least part of the herein-described methods and techniques and/or at least part of the functionality of the herein-described devices and networks.

Sensors 820 can be configured to measure conditions in an environment for computing device 800 and provide data about that environment. The data can include, but is not limited to, location data about computing device 800, velocity (speed, direction) data about computing device 800, acceleration data about computing device, and other data about the environment for computing device 800. Sensors 820 can include, but are not limited to, GPS sensor(s), location sensors(s), gyroscope(s), accelerometer(s), magnetometer(s), camera(s), light sensor(s), infrared sensor(s), and microphone(s).

Other components of computing device 800 can provide data about the environment of computing device 800 as well. For example, wireline interfaces 807 and wireless interfaces 808 can provide information about networks that are accessible and/or accessed by computing device 800, as well as other environmental information (e.g., weather information). As another example, user interface 801 can request and receive data from a user of computing device 800. Other examples are possible as well.

Some or all of sensors 820, as well as other components of computing device 800, can be controlled by the herein-described heuristics related to geofences. For example, a heuristic can control sensors 820 and other components by sending commands, such as, but not limited to commands for: activating sensor(s)/component(s), deactivating sensor(s)/component(s), periodically activating or deactivating sensor(s)/component(s), obtaining data from and/or providing data to sensor(s)/component(s), and adjusting controls, parameters, and/or other values of sensor(s)/component(s). For some or all of these commands, sensors 820 and other components of computing device 800 can provide responses, such as, but not limited to: data, measurement information, failure/success information, exception data, debugging information, and other responses.

Cloud-Based Servers

Figure 8B:
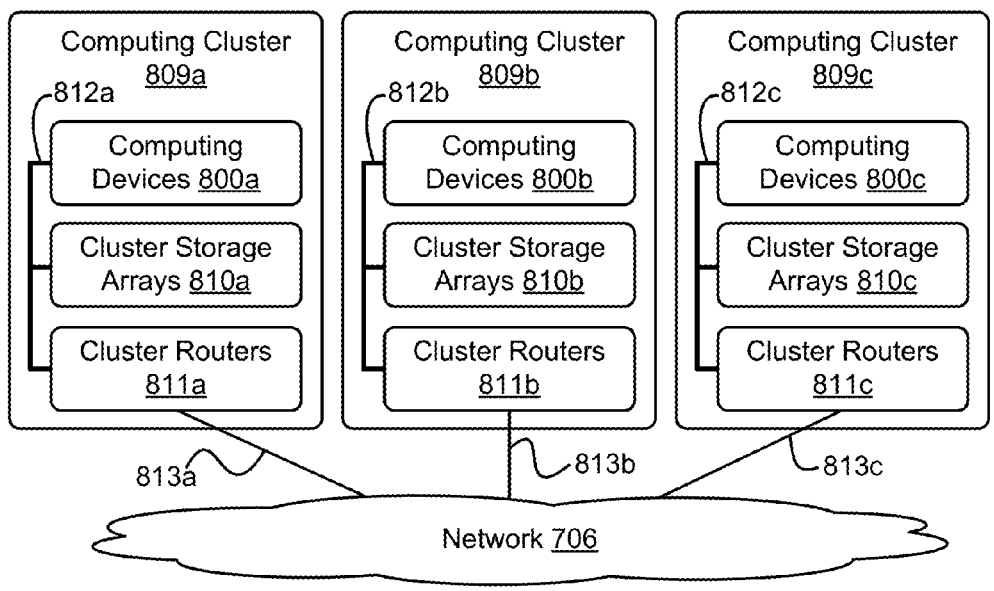
FIG. 8B depicts a cloud-based server system, in accordance with an example embodiment.

FIG. 8B depicts network 706 of computing clusters 809a, 809b, 809c arranged as a cloud-based server system in accordance with an example embodiment. Server devices 708 and/or 710 can be cloud-based devices that store program logic and/or data of cloud-based applications and/or services. In some embodiments, server devices 708 and/or 710 can be a single computing device residing in a single computing center. In other embodiments, server device 708 and/or 710 can include multiple computing devices in a single computing center, or even multiple computing devices located in multiple computing centers located in diverse geographic locations. For example, FIG. 7 depicts each of server devices 708 and 710 residing in different physical locations.

In some embodiments, data and services at server devices 708 and/or 710 can be encoded as computer readable information stored in non-transitory, tangible computer readable media (or computer readable storage media) and accessible by programmable devices 704a, 704b, and 704c, and/or other computing devices. In some embodiments, data at server device 708 and/or 710 can be stored on a single disk drive or other tangible storage media, or can be implemented on multiple disk drives or other tangible storage media located at one or more diverse geographic locations.

FIG. 8B depicts a cloud-based server system in accordance with an example embodiment. In FIG. 8B, the functions of server device 708 and/or 710 can be distributed among three computing clusters 809a, 809b, and 808c. Computing cluster 809a can include one or more computing devices 800a, cluster storage arrays 810a, and cluster routers 811a connected by a local cluster network 812a. Similarly, computing cluster 809b can include one or more computing devices 800b, cluster storage arrays 810b, and cluster routers 811b connected by a local cluster network 812b. Likewise, computing cluster 809c can include one or more computing devices 800c, cluster storage arrays 810c, and cluster routers 811c connected by a local cluster network 812c.

In some embodiments, each of the computing clusters 809a, 809b, and 809c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 809a, for example, computing devices 800a can be configured to perform various computing tasks of server 708. In one embodiment, the various functionalities of server 708 can be distributed among one or more of computing devices 800a, 800b, and 800c. Computing devices 800b and 800c in computing clusters 809b and 809c can be configured similarly to computing devices 800a in computing cluster 809a. On the other hand, in some embodiments, computing devices 800a, 800b, and 800c can be configured to perform different functions.

In some embodiments, computing tasks and stored data associated with server devices 708 and/or 710 can be distributed across computing devices 800a, 800b, and 800c based at least in part on the processing requirements of server devices 708 and/or 710, the processing capabilities of computing devices 800a, 800b, and 800c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 810a, 810b, and 810c of the computing clusters 809a, 809b, and 809c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 708 and/or 710 can be distributed across computing devices 800a, 800b, and 800c of computing clusters 809a, 809b, and 809c, various active portions and/or backup portions of these components can be distributed across cluster storage arrays 810a, 810b, and 810c. For example, some cluster storage arrays can be configured to store the data of server device 708, while other cluster storage arrays can store data of server device 710. Additionally, some cluster storage arrays can be configured to store backup versions of data stored in other cluster storage arrays.

The cluster routers 811a, 811b, and 811c in computing clusters 809a, 809b, and 809c can include networking equipment configured to provide internal and external communications for the computing clusters. For example, the cluster routers 811a in computing cluster 809a can include one or more internet switching and routing devices configured to provide (i) local area network communications between the computing devices 800a and the cluster storage arrays 801a via the local cluster network 812a, and (ii) wide area network communications between the computing cluster 809a and the computing clusters 809b and 809c via the wide area network connection 813a to network 706. Cluster routers 811b and 811c can include network equipment similar to the cluster routers 811a, and cluster routers 811b and 811c can perform similar networking functions for computing clusters 809b and 809b that cluster routers 811a perform for computing cluster 809a.

In some embodiments, the configuration of the cluster routers 811a, 811b, and 811c can be based at least in part on the data communication requirements of the computing devices and cluster storage arrays, the data communications capabilities of the network equipment in the cluster routers 811a, 811b, and 811c, the latency and throughput of local networks 812a, 812b, 812c, the latency, throughput, and cost of wide area network links 813a, 813b, and 813c, and/or other factors that can contribute to the cost, speed, fault-tolerance, resiliency, efficiency and/or other design goals of the moderation system architecture.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
receiving, at a computing device, a plurality of geofence-status indications, wherein at least one geofence-status indication of the plurality of geofence-status indications comprises training data associated with a geofence at a first location, wherein the training data comprises signal strength information from one or more networks at the first location, and wherein the geofence is associated with a geographical area;
training a geofence-status classifier of the computing device to determine a status of the geofence by providing the training data as input to the geofence-status classifier, wherein the training data comprises data for each of a plurality of training features, wherein the plurality of training features comprise a training feature associated with the signal strength information from one or more networks at the first location, and wherein the geofence-status classifier comprises a plurality of decision trees;
after the geofence-status classifier is trained, receiving query data associated with a second location at the computing device, wherein the query data comprises data for each of a plurality of query features, wherein the query data comprises signal strength information from one or more networks at the second location, and wherein the plurality of query features comprises at least one query feature associated with the signal strength information from one or more networks at the second location; providing the query data as input to the trained geofence-status classifier; and
after providing the query data as input, indicating the status of the geofence using the trained geofence-status classifier by at least:
providing the query data to at least a subset of the plurality of decision trees;
after providing the query data, determining one or more output values from the at least the subset of the plurality of decision trees; and
determining the status of the geofence by at least aggregating the one or more output values.

2. The method of claim 1, wherein the status of the geofence is selected from at least: (a) a status of being inside the geographical area associated with the geofence and (b) a status of being outside the geographical area associated with the geofence.

3. The method of claim 1, wherein aggregating the one or more output values comprises determining an average of the one or more output values.

4. The method of claim 1, wherein indicating the status of the geofence comprises indicating the status of the geofence without determining the second location.

5. The method of claim 1, wherein the plurality of decision trees comprises a first decision tree, and wherein indicating the status of the geofence using the trained geofence-status classifier comprises:
arriving at a first node of the first decision tree, wherein the first node is not a terminal node, wherein the first node is associated with a first question, and wherein the first question has two possible answers;
determining an answer to the first question based on one or more inputs;
determining whether the answer to the first question is a first answer of the two possible answers; and
after determining that the answer to the first question is the first answer, traversing to a second node of the first decision tree, wherein the second node differs from the first node.

6. The method of claim 5, further comprising:
after determining that the answer to the first question is not the first answer, traversing to a third node of the first decision tree, wherein the first node, second node, and third node are all different nodes of the first decision tree.

7. The method of claim 6, wherein the second node and third node are each terminal nodes, and wherein the second node is labeled with a status of the geofence that differs from a status of the geofence labeling the third node.

8. The method of claim 1, wherein the query data comprises data related to one or more devices operating according to an IEEE 802.11 ("Wi-Fi") standard.

9. The method of claim 1, wherein the query data does not include data specifying the second location.

10. The method of claim 1, wherein the geofence is further associated with a stationary object.

11. The method of claim 1, wherein the geofence is further associated with a moving object.

12. A computing device, comprising:
a plurality of sensors;
a processor; and
a non-transitory computer-readable storage medium having stored thereon program instructions that, upon execution by the processor, cause the computing device to perform functions comprising:
receiving a plurality of geofence-status indications, wherein at least one geofence-status indication of the plurality of geofence-status indications comprises training data associated with a geofence at a first location, wherein the training data comprises signal strength information from one or more networks at the first location, and wherein the geofence is associated with a geographical area;
training a geofence-status classifier to determine a status of the geofence by providing the training data as input to the geofence-status classifier, wherein the training data comprises data for each of a plurality of training features, wherein the plurality of training features comprise a training feature associated with the signal strength information from one or more networks at the first location, and wherein the geofence-status classifier comprises a plurality of decision trees;
after the geofence-status classifier is trained, receiving query data associated with a second location, wherein the query data comprises signal strength information from one or more networks at the second location, wherein the query data comprises data for each of a plurality of query features, and wherein the plurality of query features comprises at least one query feature associated with the signal strength information from one or more networks at the second location;

providing the query data as input to the trained geofence-status classifier; and after providing the query data as input, indicating the status of the geofence using the trained geofence-status classifier by at least:

providing the query data to at least a subset of the plurality of decision trees;

after providing the query data, determining one or more output values from the at least the subset of the plurality of decision trees; and determining the status of the geofence by at least aggregating the one or more output values.

13. The computing device of claim 12, wherein the status of the geofence is selected from at least (a) a status of being inside the geographical area associated with the geofence and (b) a status of being outside the geographical area associated with the geofence.

14. The computing device of claim 12, wherein aggregating the one or more output values comprises determining an average of the one or more output values.

15. The computing device of claim 12, wherein indicating the status of the geofence comprises indicating the status of the geofence without determining the second location.

16. The computing device of claim 12, wherein the query data comprises data related to one or more devices operating according to an IEEE 802.11 ("Wi-Fi") standard.

17. The computing device of claim 12, wherein the query data does not include data specifying the second location.

18. An apparatus, including a non-transitory computer-readable storage medium having stored thereon program instructions that, upon execution by a computing device, cause the apparatus to perform functions comprising:

receiving a plurality of geofence-status indications, wherein at least one geofence-status indication of the plurality of geofence-status indications comprises training data associated with a geofence at a first location, wherein the training data comprises signal strength information from one or more networks at the first location, and wherein the geofence is associated with a geographical area;

training a geofence-status classifier to determine a status of the geofence by providing the training data as input to the geofence-status classifier, wherein the training data comprises data for each of a plurality of training features, wherein the plurality of training features comprise a training feature associated with the signal strength information from one or more networks at the first location, and wherein the geofence-status classifier comprises a plurality of decision trees;

after the geofence-status classifier is trained, receiving query data associated with a second location, wherein the query data comprises data for each of a plurality of query features, wherein the query data comprises signal strength information from one or more networks at the second location, and wherein the plurality of query features comprises at least one query feature associated with the signal strength information from one or more networks at the second location;

providing the query data as input to the trained geofence-status classifier; and after providing the query data as input, indicating the status of the geofence using the trained geofence-status classifier by at least:

providing the query data to at least a subset of the plurality of decision trees;

after providing the query data, determining one or more output values from the at least the subset of the plurality of decision trees; and determining the status of the geofence by at least aggregating the one or more output values.

19. The apparatus of claim 18, wherein the status of the geofence is selected from at least (a) a status of being inside the geographical area associated with the geofence and (b) a status of being outside the geographical area associated with the geofence.

20. The apparatus of claim 18, wherein indicating the status of the geofence comprises indicating the status of the geofence without determining the second location.

* * * * *